(12) United States Patent
Eicher et al.

(10) Patent No.: US 10,141,856 B2
(45) Date of Patent: Nov. 27, 2018

(54) INTEGRATED MAGNETIC AND COMPOSITE SUBSTRATE WITH INCORPORATED COMPONENTS

(71) Applicants: Harold Eicher, New York, NY (US); James Lee, Pasadena, CA (US)

(72) Inventors: Harold Eicher, New York, NY (US); James Lee, Pasadena, CA (US)

( * ) Notice: Subject to any disclaimer, the term of this patent is extended or adjusted under 35 U.S.C. 154(b) by 0 days.

(21) Appl. No.: 15/495,920

(22) Filed: Apr. 24, 2017

(65) Prior Publication Data

US 2017/0309391 A1 Oct. 26, 2017

Related U.S. Application Data

(60) Provisional application No. 62/326,494, filed on Apr. 22, 2016.

(51) Int. Cl.
| | |
|---|---|
| *H01F 27/29* | (2006.01) |
| *H02M 3/335* | (2006.01) |
| *H01F 27/28* | (2006.01) |
| *H01F 27/06* | (2006.01) |
| *H01F 27/22* | (2006.01) |

(52) U.S. Cl.
CPC ........ *H02M 3/33592* (2013.01); *H01F 27/06* (2013.01); *H01F 27/22* (2013.01); *H01F 27/2804* (2013.01); *H01F 2027/2819* (2013.01)

(58) Field of Classification Search
CPC .... H02M 3/22; H02M 3/335; H02M 3/33569; H02M 3/33538; H02M 3/33546; H02M 3/33576; H02M 3/33592; H01L 25/112; H01L 25/115; H01L 7/003; H01L 25/00; H01L 27/00; H01L 2924/13091; H01L 27/32; H01L 2017/0046; H01L 2017/0086
USPC ...... 363/15, 20, 21.04, 21.06, 144; 336/199, 336/200; 327/564, 565, 566
See application file for complete search history.

(56) References Cited

U.S. PATENT DOCUMENTS

| | | | |
|---|---|---|---|
| 5,565,837 A | 10/1996 | Godek et al. | |
| 5,631,822 A | 5/1997 | Silberkleit et al. | |
| 5,973,923 A | 10/1999 | Jitaru | |
| 5,990,776 A | 11/1999 | Jitaru | |
| 6,320,490 B1 | 11/2001 | Clayton | |
| 6,927,661 B2 | 8/2005 | He et al. | |
| 2002/0191379 A1* | 12/2002 | Wildrick | H05K 3/3426 361/736 |

(Continued)

*Primary Examiner* — Adolf Berhane
(74) *Attorney, Agent, or Firm* — Dunlap Bennett & Ludwig PLLC

(57) ABSTRACT

A magnetic device assembly is provided for maximizing the size of the magnetic components for a predetermined power converter module by co-locating and sharing input, output, and auxiliary terminals between the substrates for the power converter and the magnetic components. Wherein complete power module is the result of constructing the separate constituent parts which include an integrated magnetic substrate, magnetic elements mounted therein, a power converter substrate, associated incorporated components located top and bottom on the power converter substrate, a composite mechanical footprint as defined by the mechanical extents of the integrated magnetic substrate and power converter substrate, and a composite electrical pinout as defined by the input-output pins which are coincident to and co-located as those of the integrated magnetic and power converter substrates.

22 Claims, 11 Drawing Sheets

(56) References Cited

U.S. PATENT DOCUMENTS

| | | | | |
|---|---|---|---|---|
| 2006/0232942 A1* | 10/2006 | Nakatsu | ............... | B60L 11/08 |
| | | | | 361/710 |
| 2007/0074386 A1* | 4/2007 | Lotfi | ............... | H01F 17/04 |
| | | | | 29/608 |
| 2007/0075817 A1* | 4/2007 | Lotfi | ............... | H01F 17/04 |
| | | | | 336/200 |
| 2014/0152350 A1* | 6/2014 | Ikriannikov | ............... | H03K 17/0412 |
| | | | | 327/109 |
| 2015/0200155 A1* | 7/2015 | Weld | ............... | H01L 23/49541 |
| | | | | 257/337 |
| 2015/0200156 A1* | 7/2015 | Weld | ............... | H01L 23/49541 |
| | | | | 257/531 |
| 2017/0263369 A1* | 9/2017 | Gold | ............... | H01F 27/24 |

\* cited by examiner

INTEGRATED MAGNETIC AND COMPOSITE SUBSTRATE WITH INCORPORATED COMPONENTS

CROSS-REFERENCE TO RELATED APPLICATION

This application claims the benefit of priority of U.S. provisional application No. 62/326,494, filed 22 Apr. 2016, the contents of which are herein incorporated by reference.

BACKGROUND OF THE INVENTION

The present invention relates to integrated circuits and, more particularly, to a magnetic device assembly for maximizing the size of the magnetic components for a predetermined power converter module by co-locating and sharing input, output, and auxiliary terminals between the substrates for the power converter and the magnetic components.

Conventional approaches to fitting a transformer and inductor into an integrated whole shrink their size in order to fit into a proscribed area within the larger mechanical extents of a power converter module. The size is further constricted by reserving additional space for additional power components to be placed as well within the mechanical extents of a power converter module. This is a compromise and as a result of the size being so reduced the power converter can only transmit the level of power as defined by the reduced size of these components, albeit integrated. The mind set of current state of the art arrives at the integrated transformer and inductor size only by allocating what area is left over and thus arriving at a certain reduced power level rating over what would otherwise be achievable.

Existing state of the art is such that the integrated magnetic components are reduced in size in order to fit within an area smaller than the power converter module extents. Furthermore, current state of the art devices have their electrical terminations and connections accomplished as well within that reduced area further reducing the size of these magnetic components.

The novel idea of utilizing the maximum extents of the power converter module and utilizing the input and output terminals as well allows for a much larger size for the magnetic components and so results in a higher power rating and greater efficiency.

As can be seen, there is a need for a magnetic device assembly for maximizing the size of the magnetic components for a predetermined power converter module by co-locating and sharing input, output, and auxiliary terminals between the substrates for the power converter and the magnetic components.

The present invention herein takes the bold approach of having the size of the integrated magnetic transformer and inductor extend fully to the maximum extents of the power converter module itself. In so doing it has maximized the size of these components and thus has maximized the power throughput of the power converter module. Additional power components necessary to the function of the power converter module are incorporated within the extents by fitting in windows, apertures and spaces made available at certain layers within the proscribed height that are not occupied [by design] by the magnetic core permeable elements that are part of the transformer and inductor. Furthermore, the integrated magnetic components have their terminal electrical connections defined as well by the input and output terminal connections of the power converter module. The terminal design allows for this to be accomplished. This novel idea enables the integrated magnetic elements to thus extend to the power converter module extents. There is no need to shrink the integrated magnetic components in order to accommodate their electrical connections. They can share the same proximate physical space as that of the power converter module itself.

One of the novel ideas is using the power converter maximum extents as defining the size of the integrated magnetic extents through co-locating the input and output terminals yields a larger size for the integrated magnetic device and so allows for a higher power rating and efficiency.

The concept of fabricating a transformer-inductor pair as one magnetic device and sharing a substrate has been utilized in some shape or form in the power module industry for many years. That concept consists of embedding the magnetic windings of this transformer-inductor pair within the substrate utilized by all the interconnections and traces of the power circuitry along with power and ground planes. In effect, one has what is referred to as an "embedded module".

A power module using discrete components as the transformer-inductor pair had been, and continues to this day, to be a universally adopted method to connect to the power circuitry.

SUMMARY OF THE INVENTION

In one aspect of the present invention, a magnetic device assembly includes a substantially planar power converter substrate providing incorporated power components utilizing power input and output terminals, wherein the power converter substrate has an extent defined by a predetermined power converter device and associated power input and output terminals; and a substantially planar integrated magnetic substrate providing at least one magnetic device utilizing integrated input and output terminals, wherein each integrated input and output terminal is co-located with a respective power input and output terminal, whereby, a physical extent of the integrated magnetic substrate and the power converter substrate extent are generally coextensive with each other, wherein the integrated magnetic substrate is mounted adjacent the power converter substrate so as to be spaced apart by a standoff space in a stacked orientation, wherein a portion of the incorporated power components reside within the standoff space, wherein at least one co-located power and integrated terminal is interconnected by a dual directed terminal, wherein each dual directed terminal includes a central portion extending between a distal end and a terminus end; a conductive element wrapped along a portion of the central portion; and an insulating medium between the portion of the central portion and conductive element, and wherein the distal end is generally flush with a first surface of the integrated magnetic substrate defining a buried terminus.

In certain embodiments including a heat sink disposed adjacent to at least one said distal end, wherein each dual directed terminal comprises a flat shoulder for setting the standoff distance, wherein the at least one magnetic device comprises at least one transformer-inductor pair, each comprising a transformer device and an inductor device, wherein an overall converter height is defined by the magnetic permeable elements of the magnetic elements, and wherein each heat sink is confined between said top surface and the overall converter height, wherein the predetermined power converter device is configured to accommodate industry standard mechanical dimensions and pin-outs established by DOSA, wherein the integrated magnetic substrate comprises at least one planar layer, each layer containing at least one of a plurality of conductive elements, wherein the plurality of conductive elements comprises a magnetic winding of the at least one magnetic device, and wherein each planar layer may include electrical vias, traces or paths, wherein the integrated magnetic substrate and the power converter substrate can be merged into a unified whole composite substrate, wherein the central portion makes connection to the integrated magnetic substrate, the power converter substrate, and a separate PCB to which the magnetic device assembly mounts, and wherein the buried terminus a suitably arranged blind vias configured to mount the heat sink thereon.

In certain embodiments, further including at least one power intermediate terminal associated with the predetermined power converter device; at least one integrated intermediate terminal disposed between the transformer-inductor pair co-located with a respective power terminal, wherein the at least one co-located power and integrated terminal comprises a vias internalized in the integrated magnetic substrate; and a plurality of plated surface mount pads, sometimes referred to as pad to pad connection, coupled the power converter substrate, wherein the at least one co-located power and integrated terminal is configured as a current sense transformer magnetic element for making a direct electrical connection to said input terminal.

In certain embodiments, further including a metallization coupled to at least one of the incorporated power components, and wherein at least one of the integrated terminals is configured in a shape to make connection to said metallization making required circuit connections, wherein at least one of each central portion is-proximate and not coincident to a respective terminal, wherein the at least one magnetic device comprises a transformer device nearest the integrated input terminal and an inductor device nearest the integrated output terminal, wherein the at least one magnetic devices comprises an inductor device nearest the integrated input terminal and a transformer device nearest the integrated output terminal, wherein in the at least one magnetic device comprises only a single transformer, wherein the magnetic device assemble is scalable in size alone or in conjunction with the power converter substrate to any physical size defined by the power converter itself, and wherein at least one magnetic device is discrete of the integrated magnetic substrate, and wherein the at least one magnetic device is mountable and couplable to the power converter substrate.

In one aspect of the present invention, a magnetic device assembly includes one or more magnetic devices or elements, such devices designed, fabricated and connected in a manner including: [a] at a minimum, Input and Output connections or terminals for making electrical connection to external circuit[s]; [b] at a minimum, one [1] substantially planar layer containing one or more conductive elements, paths, or traces on that or any other layer, such elements which comprise in sum a magnetic winding, such magnetic winding[s] which then forms the magnetic device[s] that comprise in total the interconnected assembly; [c] the planar layer[s] in 1.[b] above themselves forming a substrate within which interconnections, vias and traces may be placed and formed; [d] at a minimum, one [1] magnetic device which makes connection via dual-directed terminals on the Input Side of the assembly and makes direct electrical connection on that or any layer at some other point or junction interposed between one or more magnetic devices forming the interconnected assembly; [e] at a minimum, one [1] magnetic device which makes connection via dual-directed terminals on the Output Side of the assembly and makes direct electrical connection on that or any layer at some other point or junction interposed between one or more magnetic devices forming the interconnected assembly; [f] a direct electrical connection on that or any planar layer of said magnetic devices to external circuit[s] accomplished in a manner that connects directly to the Input and Input Return locations as dual directed terminal connections which are co-located and share physically the same space of said external circuit[s] Input and Input Return locations; [g] a direct electrical connection on that or any planar layer of said magnetic devices to external circuit[s] accomplished in a manner that connects directly to the Output and Output Return locations as dual-directed terminal connections which are co-located and share physically the same space of said external circuitry's Output and Output Return locations; [h] a direct electrical connection on that or any planar layer of said magnetic devices, at a point interposed between or intermediate to those same magnetic devices, accomplished in a manner that connects directly to the Intermediate locations of external circuit[s] as dual-directed terminal connections which are co-located and share physically the same space of said external circuitry's Intermediate locations; [i] use of co-located dual-directed terminal connections on the Input, Intermediate and Output Side of the assembly, such interconnected magnetic devices having windings and conductive elements that can now traverse space or area within that layer or any subsequent layers that would otherwise be physically occupied by terminal connections that do not use a double-directed termination method; and [j] use of dual-directed terminals on the Input, Intermediate and Output Side of the assembly with the entire assembly now conducting heat from dissipated power through those same double directed terminal connections and via convection due to the larger available surface area now made available, wherein the one [1] or more magnetic devices or elements comprising the entire structure can be constructed in a manner wherein: [a] each substantially planar layer containing one or more conductive elements, paths, or traces on that layer, which thereby comprise in sum a magnetic winding can be further connected, in series or parallel, to one or more conductive elements, paths, or traces on any other layer, adjacent to that layer or on some alternate layer, such elements which then, in combination, form a magnetic winding as well; [b] an insulating layer or layers is interposed between conducting layers so as to perform said insulating function between layers of a particular winding so formed as in 2.[a] above; [c] an insulating layer or layers is interposed between conducting layers of windings so as to perform said insulating function between layers of particular winding sets that so comprise the transformer or inductor device or element within the assembly; [d] the connection of conducting elements, paths, or traces on each layer layers through insulating layers interposed within a winding is accomplished with inter-layer vias, thru-holes, edge connections or physical terminals in order to form the winding for that transformer or inductive element so desired; [e] multiple windings may be formed in the manner described in 2.[a],[b],[c], and [d] above in order to construct a transformer or inductor device that is part of the integrated magnetic assembly; [f] at least one aperture, is created in each layer and through each composite layer so arranged and stacked one over the other in order to accommodate at least one [1] permeable magnetic material [core] placed in such aperture[s] with the function to couple the windings and layers together so as to function as a transformer or inductor in a given circuit topology; [g] at least one aperture, is created in each layer and through each composite layer so arranged and stacked one over the other in order to accommodate at least one [1] permeable magnetic material [core] placed in such aperture[s] with the function to couple the windings and layers together so as to function as a coupled transformer-inductor pair in a given circuit topology; [h] many apertures are created in each layer and through each composite layer so arranged and stacked one over the other in order to accommodate at least one [1] permeable magnetic material [core] placed in such aperture[s] in a matrix-array with the function to couple the windings and layers together so as to function as a transformer or inductor in a given circuit topology, wherein the one [1] or more magnetic devices or elements including the entire structure is constructed in a manner fitted for industry standard length and widths wherein: [a] its physical dimensions are the same, or proximate to, that of the external circuit[s] to which it connects so that the physical length and width of the completed assembly is of the same proximate length and width dimensions as the interconnected magnetic assembly itself. wherein the one [1] or more magnetic devices or elements comprising the entire structure consists in its entirety of: [a] a minimum of at least two [2], or more distinct transformer devices which comprise the windings on each planar layer, wherein the one [1] or more magnetic devices or elements comprising the entire structure can consist in its entirety of: [a] a minimum of at least two [2] or more distinct inductor devices which comprise the windings on each planar layer, wherein the one [1] or more magnetic devices or elements comprising the entire structure can consist of: [a] a varied mix and number of transformer and/or inductor windings on each planar layer, its interconnections so configured so as to comply with a particular power conversion circuit topology.

In yet another embodiment of the present invention, in the case of its application in a Single-Ended power conversion topology wherein one magnetic device, the transformer, occupies the $1^{st}$ position nearest the Input and the second magnetic device, an inductor, occupies the $2^{nd}$ position nearest the Output, and: [a] the internal connection on any planar layer of the transformer winding to the Input external circuit[s] is accomplished in a manner that allows for direct electrical connection as well as co-locating and sharing physically the same space of the Input terminal; [b] the internal connection on any planar layer of the inductor winding to the Output or Output Return external circuit[s] is accomplished in a manner that allows for direct electrical connection as well as co-locating and sharing physically the same space of the Output or Output Return terminal; [c] a direct electrical connection on any planar layer of these magnetic devices, at a point interposed between or intermediate to these same magnetic devices, which may also make direct electrical connection directly to the Intermediate locations of external circuit[s] as connections which are co-located and share physically the same space of said external circuitry's Intermediate locations. Or, in the case of its application in a Double-Ended power conversion topology wherein one magnetic device, the transformer, occupies the $1^{st}$ position nearest the Input and the second magnetic device, an inductor, occupies the $2^{nd}$ position nearest the Output, and: [a] the internal connection on any planar layer of the transformer winding to the Input external circuit[s] is accomplished in a manner that connects directly to the Input and Input Return locations as dual directed terminal connections which are co-located and share physically the same space of said external circuit[s] Input and Input Return locations; [b] the internal connection on any planar layer of the inductor winding to the Output or Output Return external circuit[s] is accomplished in a manner that connects directly to the Output terminal connection via direct electrical connection which is co-located and shares physically the same space of the external circuit[s] Output or Output Return location; [c] a direct electrical connection on any planar layer of these magnetic devices, at a point interposed between or intermediate to these same magnetic devices, which may also make direct electrical connection directly to the Intermediate locations of external circuit[s] as connections which are co-located and share physically the same space of said external circuitry's Intermediate locations.

Moreover, in the case of its application in a Double-Ended power conversion topology wherein one magnetic device, the transformer, occupies the $1^{st}$ position nearest the Input and two magnetic devices, [2] inductors occupies the $2^{nd}$ position nearest the Output, and: [a] the internal connection on any planar layer of the transformer winding to the Input external circuit[s] is accomplished in a manner that connects directly to the Input and Input Return locations as dual directed terminal connections which are co-located and share physically the same space of said external circuit[s] Input and Input Return locations; [b] the internal connection on any planar layer of one [1] inductor winding is to the Output terminal connection and the $2^{nd}$ inductor winding is to the Output Return terminal connection and both are accomplished in a manner that connects directly to the Output and Output Return terminal connections via direct electrical connection which is co-located and shares physically the same space of the external circuit[s] Output and Output Return location; [c] a direct electrical connection on any planar layer of these magnetic devices, at a point interposed between or intermediate to these same magnetic devices, which may also make direct electrical connection directly to the Intermediate locations of external circuit[s] as connections which are co-located and share physically the same space of said external circuitry's Intermediate locations.

In the case of its application in a Double-Ended power conversion topology wherein one magnetic device, an inductor, occupies the $1^{st}$ position nearest the Input and a second magnetic device, the transformer, occupies the $2^{nd}$ position nearest the Output, and: [a] the internal connection on any planar layer of the Inductor winding to the Input external circuit[s] is accomplished in a manner that connects directly to the Input terminal connection via direct electrical connection which is co-located and shares physically the same space of the external circuit[s] Input location; [b] the internal connection on any planar layer of the transformer winding to the Output and Output Return external circuit[s] is accomplished in a manner that connects directly to the Output and Output Return terminal connection via direct electrical connection which is co-located and shares physically the same space of the external circuit[s] Output location[s]; [c] a direct electrical connection on any planar layer of these magnetic devices, at a point interposed between or intermediate to these same magnetic devices, which may also make direct electrical connection directly to the Intermediate locations of external circuit[s] as connections which are co-located and share physically the same space of said external circuitry's Intermediate locations, wherein; [a] the Input/Output and Intermediate co-located terminal connections, whether direct electrical or double directed function, are themselves each or singularly comprised of a winding and magnetic permeable core in order to perform a current sensing function within the interconnected magnetic assembly and as part of the overall circuit topological scheme, wherein: [a] the Input/Output and Intermediate co-located terminal connections, whether direct electrical or double directed function, are themselves each or singularly comprised of a winding and magnetic permeable core in order to perform a circuit filtering function within the interconnected magnetic assembly and as part of the overall circuit topological scheme, wherein: [a] the Input/Output and Intermediate co-located terminal connections, whether direct electrical or double directed function are themselves each or singularly comprised of a central magnetic permeable core in order to perform a circuit filtering function within the interconnected magnetic assembly and as part of the overall circuit topological scheme, wherein: [a] the design, fabrication and construction of the double directed and co-located Input/Output and Intermediate terminal connections consists of two [2] conductive cylinders concentric along a common axis and separated by an insulating medium; [b] the design, fabrication and construction of the double directed and co-located Input/Output and Intermediate terminal connections consist of a pin within a conductive cylinder, separated by an insulating medium, wherein: [a] the design, fabrication and construction of the double directed and co-located Input/Output and Intermediate terminal connections consists of one or more multiple plated through hole vias made in a multi-layer pcb or monolithic structure and are integrated with one or more of the planar layers of the interconnected magnetic assembly, wherein: [a] the design, fabrication and construction of the double directed and co-located Input/Output and Intermediate terminal connections consist a flat shoulder that functions as a standoff to set the height of the interconnected magnetic assembly so as to just clear the components of the external circuit[s] assembly located underneath, wherein: [a] the design, fabrication and construction of the double directed and co-located Input/Output and Intermediate terminal connections consist of a continuation pin that extends further outward and makes connection to the external circuit[s] assembly located underneath.

The scalability of the interconnected magnetic assembly includes [a] the physical size of the interconnected magnetic assembly is scaled, larger or smaller, in proportion, in order to accommodate power throughput and to dissipate heat produced by the integrated magnetic assembly; [b] the physical size of the interconnected magnetic assembly is scaled, larger or smaller, in proportion, in order to accommodate industry standard mechanical dimensions and pin-outs and specifically, those established by DOSA; [c] the design, fabrication and physical size of the individual magnetic devices that form the interconnected magnetic assembly is scaled in proportion to standard Input/Output terminal, connector, or header size location within the overall increased/decreased physical size of the entire structure.

The present invention may include [a] one or more of the layers of the magnetic devices contained within the integrated magnetic assembly itself has a conducting layer which is connected to or forms part or all of the top and/or bottom surface of the integrated magnetic assembly and makes direct contact, through an insulating medium, to a heat sink or plate specifically constructed to the scaled size of the integrated magnetic assembly and so conducts heat directly to an external assembly, device, heat sink or plate and to the surrounding environment, wherein: [a] a space or area is reserved both top and bottom of the one or more planar layers in order to accommodate the footprint and to make electrical connection to other components that would otherwise be part of or placed as external circuit components; [b] the placing of components on the top or bottom of the integrated magnetic assembly also incorporates their integration into the heat sink specifically constructed to the scaled size of the integrated magnetic assembly, wherein: [a] a space or area normally dedicated to the traces or conductive elements of one or more substantially planar layers that comprise the entire interconnected magnetic assembly are instead reserved for and dedicated to accommodate and clear the physical outline and footprint of other components that are part of or placed as external circuit components on that external component assembly to which the interconnected magnetic assembly is connected to; [b] the placing of external circuit components on the external assembly also incorporates their integration into the heat sink specifically constructed to the scaled size of the integrated magnetic assembly, wherein: [a] the at least one [1] permeable magnetic core placed in aperture[s] and located within the interconnected magnetic assembly is designed and constructed so as to have a base height dimension that will not interfere with and will have a clearance over power components that are part of the external assembly.

In yet another embodiment of the present invention, a power conversion module fabricated utilizing an integrated magnetic assembly may be constructed in the following manner: [a] taking the interconnected magnetic assembly of one or more layers of substantially planar construction which consists of one [1] or more magnetic devices with permeable magnetic core[s] inserted into apertures in that assembly, and connecting it to other external circuit components, utilizing the same physical location as the external circuit[s] Input and Output terminals, so as to comprise a power conversion module; [b] making the connection from the interconnected magnetic assembly in [a] above to the external power conversion module's circuit[s] Input and Input Return connection locations via direct or double directed terminal connections, which are co-located and share physically the same space with the Input and Input Return connections of the external power conversion module's circuit[s] thus forming a completed power conversion module with one [1] set of Input and Input Return connection terminals; [c] making the connection from the interconnected magnetic assembly in [a] above to the external power conversion module's circuit[s] Output and Output Return connection locations via direct or double directed terminal connections, which are co-located and share physically the same space with the Output and Output Return connections of the external power conversion module's circuit[s] thus forming a completed power conversion module with one [1] set of Output and Output Return connection terminals, wherein with the additional step of: [a] taking the interconnected magnetic assembly of one or more layers of substantially planar construction which consists of one [1] or more magnetic devices with permeable magnetic core[s] inserted into apertures in that assembly, and connecting it to other external circuit components, utilizing the same physical location as the external circuit[s] Intermediate terminals, so as to comprise a power conversion module; [b] making the connection from the interconnected magnetic assembly in [a] above to the external power conversion module's circuit [s] Intermediate connection locations via direct or double directed terminal connections, which are co-located and share physically the same space with the Intermediate connections of the external power conversion module's circuit [s] thus forming a completed power conversion module with one [1] set of Intermediate connection terminals, wherein the power conversion module fits industry standards such that: [a] the integrated magnetic assembly incorporated into the construction of a power conversion module occupies the entire physical length and width of the power conversion module and, as such, once constructed, is of the same proximate mechanical length and width dimensions of the power module itself; [b] the construction outlined in 22.[a] above furthermore utilizes direct connected or double directed terminal connections of the interconnected magnetic assembly which occupy the same proximate physical location as the power conversion module's and external circuit's Input and Output terminals, wherein: [a] once components comprising the external circuit[s] are assembled thereto and thus form a completed power conversion module, that the overall length and width dimensions of the resulting power conversion module is substantially equal to, comparable, or commensurate to that of an industry standard embedded power conversion module, including DOSA compatible standard modules, wherein such that: [a] the interconnected magnetic assembly, along with one [1] or more magnetic devices with permeable magnetic core[s] inserted into apertures in that assembly, are fitted onto a separate assembly, pcb, or substrate consisting of external circuit[s] and their components; [b] the construction outlined in 24.[a] above furthermore utilizes direct connected or double directed terminal connections of the interconnected magnetic assembly which serve the dual function of and occupy the same proximate physical location as that separate assembly, pcb, or substrate and its circuit's Input and Output terminals; [c] the terminal connections of the interconnected magnetic assembly and the separate assembly, pcb, or substrate circuit's Input and Output terminals forms a completed power conversion module with one [1] set of Input and Output terminal connections which occupy the same proximate physical location as that of the entire power conversion module, such that: [a] the interconnected magnetic assembly, along with one [1] or more magnetic devices with permeable magnetic core[s] inserted into apertures in that assembly, are fitted onto a separate assembly, pcb, or substrate such that the magnetic cores set the height of the integrated magnetic assembly as it sits, either top or bottom, on that separate assembly; [b] the interconnected magnetic assembly, along with its magnetic core[s] is fitted onto a separate assembly, pcb, or substrate such that the direct connected or dual directed Input and Output terminal connections thus shared in the same proximate physical location set the height of the integrated magnetic assembly as it sits, either top or bottom, on that separate assembly; [c] the interconnected magnetic assembly, along with its magnetic core[s] and the separate assembly, pcb, or substrate along with its components which comprise in total the height of the resultant power conversion module thus constructed, wherein: [a] once components comprising the external circuit[s] are assembled thereto and thus form a completed power conversion module, that the overall height of the resulting power conversion module is substantially equal to, comparable, or commensurate to that of an industry standard embedded power conversion module, including DOSA compatible standard modules, wherein selective scalability is provided through: [a] the physical size of the power conversion module is scaled, larger or smaller, in proportion, in order to accommodate power throughput and to dissipate heat produced by the integrated magnetic assembly; [b] the physical size of the power conversion module is scaled, larger or smaller, in proportion, in order to accommodate industry standard embedded power conversion module dimensions and pin-out, specifically including those established by DOSA; and [c] the design, fabrication and physical size of the individual magnetic devices that form the interconnected magnetic assembly within the power conversion module are scaled in proportion to standard Input/Output terminal, connector, or header size location within the overall increased/decreased physical size of the entire structure.

There are several novel elements that comprise individually and together this invention. First and foremost is the novel concept to size and scale the Integrated Magnetic structure so that it occupies and shares the footprint of the overall converter into which it is subsequently integrated. In short, the footprint of the Integrated Magnetic becomes one and the same, or proximately thereof, of the power converter itself.

In order to make the present invention the center piece of the design in this novel fashion it is necessary to make a second novel and creative idea and that is to occupy the same input/output terminals and pinouts of the converter itself. What that means is that the converter input/output terminals which interconnect to external circuit elements and components are the very same Integrated Magnetic terminals which project or extend from it.

This seeming contradiction gets resolved by a third novel step and idea which involves the creative design and application of those terminals so that they can be simultaneously utilized by both the Integrated Magnetic element and the converter itself. In one preferred embodiment, the terminals are designed to have a central conductive portion with a surrounding cylinder portion that is insulated from the central portion. In that same embodiment as well as other embodiments, the top portion of the terminal or pin is such that it has a "buried head". A secondary consideration and benefit of doing same is to aid in structural integrity and heat extraction—patentable claims as well. The main benefit, however, is that only one terminal is necessary to perform two functions and thus space is not needed for the two.

A fourth novel and creative idea is to allocate the area and footprint of the Integrated Magnetic structure and configure it in such a way as to incorporate the power and energy storage components within the spaces and apertures of the Integrated Magnetic structure. This will be demonstrated via discussion of some of the preferred embodiments which describe this invention. In effect, many of the vertical spaces within the Integrated Magnetic footprint can be utilized to incorporate these components. This is a consequence of the fact that the winding substrate occupies the magnetic core window height whereas the magnetic core itself occupies the effective total height of the complete Integrated Magnetic. The result is there is room available from the top down to the substrate and from the bottom up to the substrate.

A fifth novel and creative idea is then to devise a method to access these components and Integrated Magnetic simultaneously in order to extract heat from the overall structure. In order to accomplish this, a sixth novel and creative idea is to design and implement the terminals of the TX-ID and converter itself—both input/output and others such as may be required—so that they are substantially planar with one or more surfaces within a vertical space so that a heat sink may bond intimately with that surface, and thus, that component and the TX-ID and so, extract heat from all these power elements. Again, all of these ideas and practical implementations will be discussed by referral to the figure drawings and preferred embodiments which accompany this patent.

These and other features, aspects and advantages of the present invention will become better understood with reference to the following drawings, description and claims.

BRIEF DESCRIPTION OF THE DRAWINGS

FIG. 6b is an exploded isometric view of FIG. 6a;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a magnetic device assembly for maximizing the size of the magnetic components for a predetermined power converter module by co-locating and sharing input, output, and auxiliary terminals between the substrates for the power converter and the magnetic components.

Figure 1:
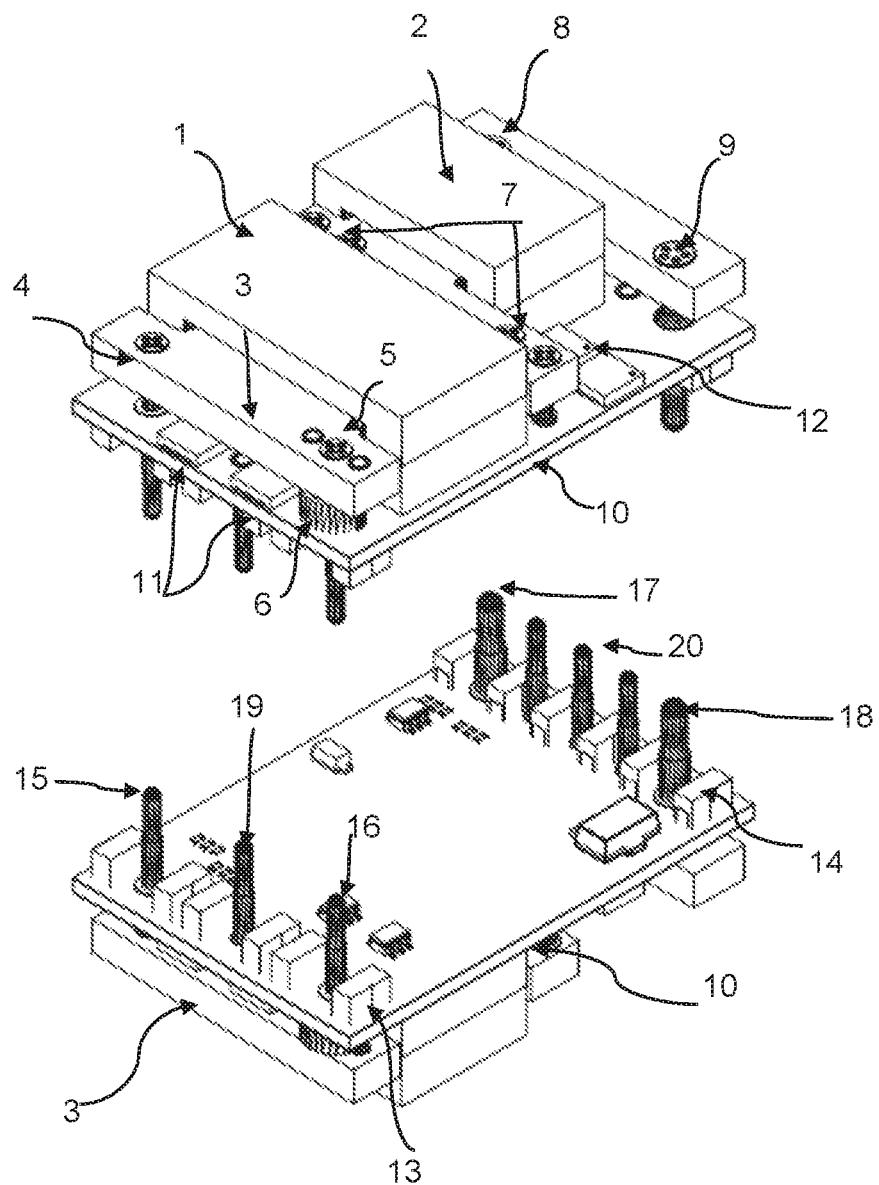
FIG. 1 is an isometric view of an exemplary embodiment of the present invention, and shown from an inverter isometric view.

Referring to FIG. 1 the present invention may include an Integrated Magnetic Element Transformer Position 1; an Integrated Magnetic Element Inductor Position 2; at least one Integrated Magnetic Substrate Layer 3; at least one Integrated Magnetic Substrate Input Terminal 4; at least one Integrated Magnetic Substrate Input Return Terminal 5; at least one Integrated Magnetic Substrate Input Return Terminal Cylinder 6; at least one Integrated Magnetic Substrate Secondary Side Terminal 7; at least one Integrated Magnetic Substrate Output Terminal 8; at least one Integrated Magnetic Substrate Output Return Terminal 9; at least one Power Converter Substrate Layer 10; at least one Power Converter Substrate Top Layer Input-Side Incorporated FET Components 11; at least one Power Converter Substrate Top Layer Secondary-Side Incorporated FET Components 12; at least one Power Converter Substrate Bottom Layer Input-Side Incorporated Component 13; at least one Power Converter Substrate Bottom Layer Output-Side Incorporated Components 14; at least one Power Converter Substrate Input Terminal 15; at least one; Power Converter Substrate Input Return Terminal 16; at least one Power Converter Substrate Output Terminal 17; at least one Power Converter Substrate Output Return Terminal 18; at least one Power Converter Substrate Input Aux Terminal 19; and at least one Power Converter Substrate Output Aux Terminal 20.

The Integrated Magnetic element transformer core 1 and Integrated Magnetic element inductor core 2 may be inserted into the Integrated Magnetic Substrate 3 at positions 1 and 2 respectively. The Integrated Magnetic Substrate 3 may be such that it extends entirely to the maximum physical extents which also define the physical extents of the power converter of which it is a part. The Integrated Magnetic Substrate 3 may include of at least one layer and, in a certain embodiment, ten layers consisting of copper traces which are arranged so as to constitute the windings respectively of the transformer 1 and inductor 2. The substrate 3 may have an Input Terminal 4 which protrudes through and makes contact with appropriate traces and conductors on layers within the substrate 3. In certain embodiments and for this particular power conversion topology, it may be one and the same as the Input Terminal for the entire power converter module 15. The substrate 3 may have an Input Return Terminal 5 which protrudes through and, if required by the design, makes connection with appropriate traces and conductors within the substrate 3. A cylindrical portion of this terminal 6 may protrude through and makes connection within the substrate 3 at various layers therein as well to the traces that may be placed at any layer or several layers of the substrate 3. Integrated Magnetic Secondary Side Terminals 7 may be similarly located on the secondary side of the substrate 3. They may protrude through the substrate and make required secondary side connections with traces and conductors located at various layers within said substrate 3. On the output side of the Integrated Magnetic Substrate 3 there is an Integrated Magnetic Output Terminal at location 8; it may also correspond to the output terminal 17 of the power converter module as well both physically and electrically; and it may protrude through the substrate 3 making such required connections to traces therein. There may be an Output Return Terminal 9 which protrudes through the substrate 3 making any required connections therein. It corresponds as well physically and electrically to the power converter output terminal return 18. A power converter substrate 10 can be either internal or external and consists of at least one layer. It contains on its top layer incorporated components 11 and 12. On its bottom layer it may contains incorporated components 13 and 14. The power converter input terminals 15 and 16 of the power substrate 10 may be extensions from the Integrated Magnetic Substrate 3 terminals 4 and 5. Similarly, the Output Terminals 17 and 18 are extensions from Integrated Magnetic terminals 8 and 9. The Aux terminals 19 and 20 may need only extend into the power converter substrate 10. The result is a complete power converter module.

Since the power throughput and efficiency of a power converter module is directly proportional to the size of the magnetic elements used therein, it is paramount to maximize their size. The present invention may do so by using the physical extents as defined by that of the power converter module. To do so it is also required to occupy the proximate or exact physical locations of the input and output terminals as well. The power converter module consists of an Integrated Magnetic Substrate 3 and a power converter substrate 10. These two substrates share the same Input Terminals 15 corresponding to 4 and 16 corresponding to 5. Likewise, they share the same output terminals 17 corresponding to 8 and 18 corresponding to 9. If the two substrates did not share terminal locations then precious space is lost. The concept of sharing terminals is novel. Doing so increases the allocation of space in order to increase the size of the magnetic elements. This improves power function throughput. Sharing terminal functionality also enables the substrate size to expand to the maximum extents of the power converter module. Doing so may now worthwhile to constructively expand the magnetic element size. If the terminals were constrained within some inner lesser dimension or extent then there would be no reason to extend the Integrated Magnetic Substrate 3 as such. The magnetic permeable core elements inserted into the substrate 3 at locations 1 and 2 only occupy a portion of the maximum physical extents. There may yet substantial area left over to allocate space for incorporated power components. In addition, within the overall height of that enclosed space there are sufficient apertures and spaces within which to strategically locate these components. A novel idea of the present invention is to place said components on a 2nd power converter substrate at a separate Z-axis location within the power converter module. Doing so is beneficial as it allows the heat generated by these components to be conducted via that substrate. In one embodiment, the top side components 11 and 12 may be so placed. Heat may be extracted by conduction into the substrate for components 11. Heat may be extracted upward to a suitable place heat sink for components 12. A suitably allocated aperture above components 12 in the substrate 3 may be created to allow this. The net effect is increased power throughput and lower temperature rise for the individual components and the entire power converter module. The spacing of the input and output terminals may be adequate to allow for component placement 13 and 14 on the bottom of the power converter substrate. When combined together, the entire construction of heat sink on top, Integrated Magnetic Substrate 3, power components on top and bottom of power converter substrate and shared terminals results in composite power converter module that has the greatest power density for a given volume and the lowest temperature rise for processing a given amount of power.

Figure 2:
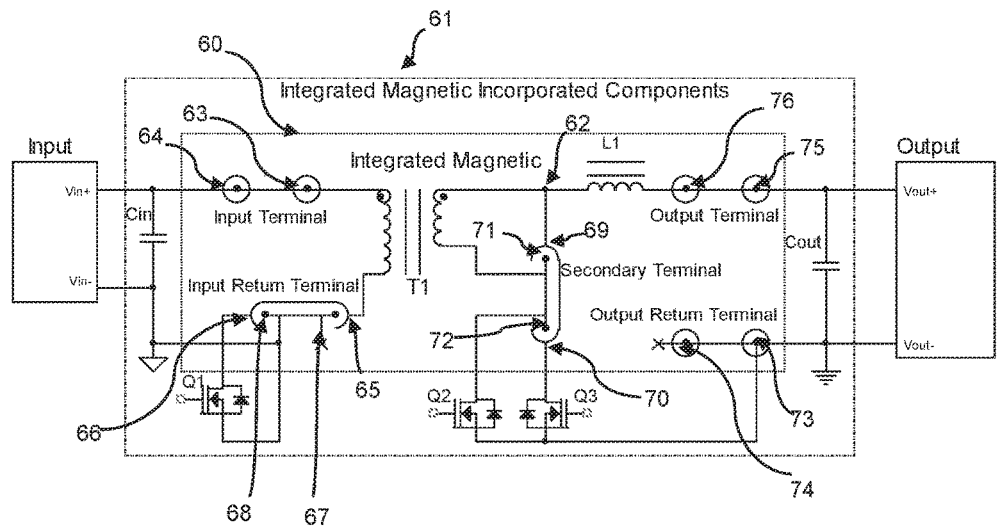
FIG. 2 is a schematic view of an exemplary embodiment of the present invention.

A schematic diagram is shown in FIG. 2 which is that of a single-ended converter, specifically, a forward converter topology. The Integrated Magnetic 60 encompasses T1 and L1 as well as the Input Terminal, Input Return Terminal, Output Terminal, Output Return Terminal, and Secondary Terminal. The boundary is indicated by the dashed line border of the inner rectangle. The power components Q1-Q3 and storage elements Cin, Cout are typical components of the power converter but do not explicitly form part of the Integrated Magnetic itself and instead form a separate group of components 61, indicated by the dashed boundary of the larger rectangle. The Integrated Magnetic must incorporate these components into an overall structure to form a power converter. An Input block is shown which represents the input source of power to the entire power converter. An Output block is shown which represents the load to which the entire power converter supplies power. The Integrated Magnetic connects to Input and Output blocks through its integrated terminals. The Integrated Magnetic, by means of its terminal connections, occupies and is co-located with the input/output terminal locations allocated for the power converter. In this way, the Integrated Magnetic terminals perform the dual function of connecting the Integrated Magnetic and all power components to the Input and Output circuitry. The power components and storage elements are incorporated into the overall power converter structure in those spaces, windows and apertures otherwise not occupied by the Integrated Magnetic.

The Input Terminal part of the Integrated Magnetic forms a connection electrically and physically at location 64 with Vin+ Input block and Cin+. This same terminal, further along, connects with the "dot" end of T1 at location 63, which is part of the Integrated Magnetic substrate. It can be a direct connection and have electrical continuity because in a forward converter, Vin+ is typically connected as such.

The Input Return Terminal needs to perform two functions. In the embodiment shown, the surrounding "cylinder" portion of the terminal 65 connects to the "non-dot" of T1 at the Integrated Magnetic substrate. This same "cylinder" further along connects at another point 66 with the drain terminal of Q1. The "central" portion of the Input Return Terminal connects at 68 to Input block Vin- and the intersection of Cin- at one physical location and further along, also to the Integrated Magnetic substrate physically at 67, but not electrically, since that is not a requirement of the circuit topology in this instance.

Concisely, this is how the Integrated Magnetic Input Terminals occupy the same physical space as that of the Input terminals of the power converter itself and so comprise those very same terminals. This novel connection forms one basic novel claim but secondarily is important both for structural support and heat conduction both of which form patentable claims as well.

The Output Terminal part of the Integrated Magnetic forms a connection electrically and physically at 75 with Vout+ Output block and Cout, and further along connects to the output side of L1 76 which is part of the Integrated Magnetic substrate. It can be a direct connection and have electrical continuity because in a forward converter, Vout+ is typically connected as such.

The Secondary Terminal needs to perform two functions. In this embodiment, the surrounding "cylinder" portion of the terminal 69 connects to the secondary winding "dot" of T1 and the intersection of L1 at the Integrated Magnetic. This same "cylinder" further along connects at another point 70 with the drain terminal of Q3. Important to note is that an internal connection 62 between T1 and L1 can still be made directly as part of the Integrated Magnetic. The "central" portion of the Secondary Terminal connects at 72 to the drain terminal of Q2 and then, further along, to the Integrated Magnetic "non-dot" of T1 secondary physically at location 67 which is physically part of the Integrated Magnetic substrate.

The Output Return Terminal part of the Integrated Magnetic forms a connection electrically and physically at 73 with Vout- Output block and Cout-, and also to the Integrated Magnetic substrate physically at 74, but not electrically, since that is not a requirement of the circuit topology in this instance.

Concisely, this is how the Integrated Magnetic Output Terminals occupy the same physical space as that of the Output terminals of the power converter itself and so comprise those very same terminals. This novel connection forms one basic patentable claim but secondarily is important both for structural support and heat conduction both of which form patentable claims as well.

Figure 3:
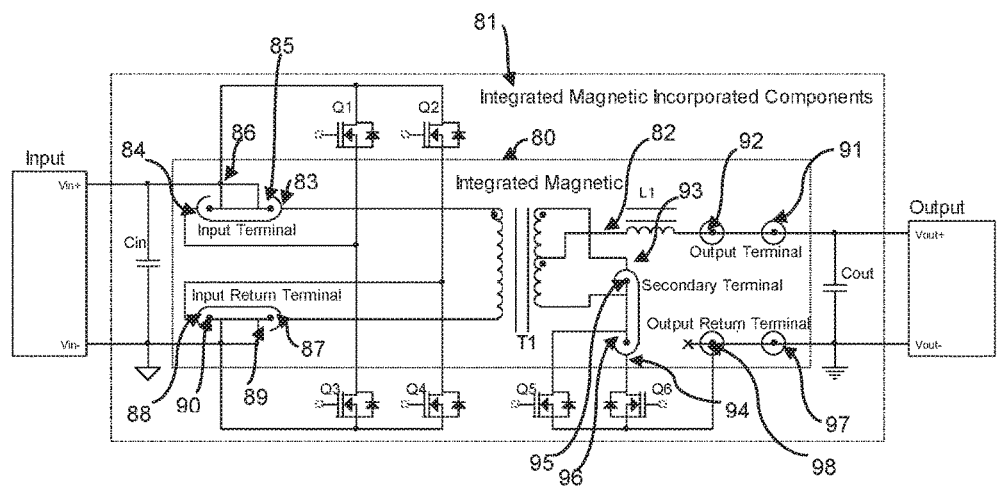
FIG. 3 is a schematic view of an exemplary embodiment of the present invention.

A schematic diagram is shown in FIG. 3 which is that of a double-ended converter, specifically, a bridge to full wave center-tap converter topology. The Integrated Magnetic 80 encompasses T1 and L1 as well as the Input Terminal, Input Return Terminal, Output Terminal, Output Return Terminal, and Secondary Terminal. The boundary is indicated by the dashed line border of the inner rectangle. The power components Q1-Q6 and storage elements Cin, Cout are typical components of the power converter but do not explicitly form part of the Integrated Magnetic itself and instead form a separate group of components 81, indicated by the dashed boundary of the larger rectangle. The Integrated Magnetic must incorporate these components into an overall structure to form a power converter. An Input block is shown which represents the input source of power to the entire power converter. An Output block is shown which represents the load to which the entire power converter supplies power. The Integrated Magnetic connects to Input and Output blocks through its integrated terminals. The Integrated Magnetic, by means of its terminal connections, occupies and is co-located with the input/output terminal locations allocated for the power converter. In this way, the Integrated Magnetic terminals perform the dual function of connecting the Integrated Magnetic and all power components to the Input and Output circuitry. The power components and storage elements are incorporated into the overall power converter structure in those spaces, windows and apertures otherwise not occupied by the Integrated Magnetic. It will be demonstrated in later discussions of preferred and other embodiments how these components are incorporated into the overall structure.

The Input Terminal part of the Integrated Magnetic needs to perform two functions. In the embodiment shown, a surrounding "Cylinder" portion of the terminal forms a connection electrically and physically with the "dot" end of T1 Primary winding at location 83, which is part of the Integrated Magnetic substrate. This same "cylinder" further along connects to Q1 Source and Q3 Drain at location 84.

The central portion of the Input Terminal is physically part of the Integrated Magnetic substrate at 85 but it makes no electrical connection to the Integrated Magnetic in this embodiment. Instead, the central portion makes connection between Vin+ and Cin+ at location 86 and simultaneously with the Drain terminals of Q1 and Q2.

The Input Return Terminal part of the Integrated Magnetic needs to perform two functions. In the embodiment shown, a surrounding "Cylinder" portion of the terminal forms a connection electrically and physically with the "non-dot" end of T1 Primary winding at location 87, which is part of the Integrated Magnetic substrate. This same "cylinder" further along connects to Q2 Source and Q4 Drain at location 88.

The central portion of the Input Return Terminal is physically part of the Integrated Magnetic substrate at location 89, but it makes no electrical connection to T1 in this embodiment. Instead, the central portion makes connection between Vin− and Cin− at location 90 and simultaneously with the Source terminals of Q3 and Q4.

Concisely, this is how the Integrated Magnetic Input Terminals occupy the same physical space as that of the Input terminals of the power converter itself and so comprise those very same terminals. This novel connection forms a basic claim with regards to this invention but secondarily form separate claims as this connection method is important both for structural support and heat conduction.

The Output Terminal part of the Integrated Magnetic forms a connection electrically and physically at 91 with Vout+ Output block and Cout, and further along connects to the output side of L1 92 which is part of the Integrated Magnetic substrate. It can be a direct connection and have electrical continuity because in this bridge converter embodiment, Vout+ is typically connected as such. Important to note is that an internal connection 82 between T1 center-tap and L1 can still be made directly as part of the Integrated Magnetic substrate.

The Secondary Terminal needs to perform two functions. In this embodiment, the surrounding "cylinder" portion of the terminal 93 connects to the secondary winding "dot" of T1 as part of the Integrated Magnetic substrate. This same "cylinder" further along connects at another point 94 with the drain terminal of Q6. The "central" portion of the Secondary Terminal connects at to the Integrated Magnetic substrate "non-dot" of T1 secondary physically at location 95. It proceeds further along to connect to the drain terminal of Q5 at location 96.

The Output Return Terminal part of the Integrated Magnetic forms a connection electrically and physically at 97 with Vout− Output block and Cout−. Simultaneously, it makes physical and electrical connection at that same point with the Source terminals of Q5,Q6. It proceeds further along to the Integrated Magnetic physically at 98, but not electrically, since that is not a requirement of the circuit topology in this instance.

Concisely, this is how the Integrated Magnetic Output Terminals occupy the same physical space as that of the Output terminals of the power converter itself and so comprise those very same terminals. This novel connection forms the basic patentable claim but secondarily is important both for structural support and heat conduction both of which form patentable claims as well.

Figure 4:
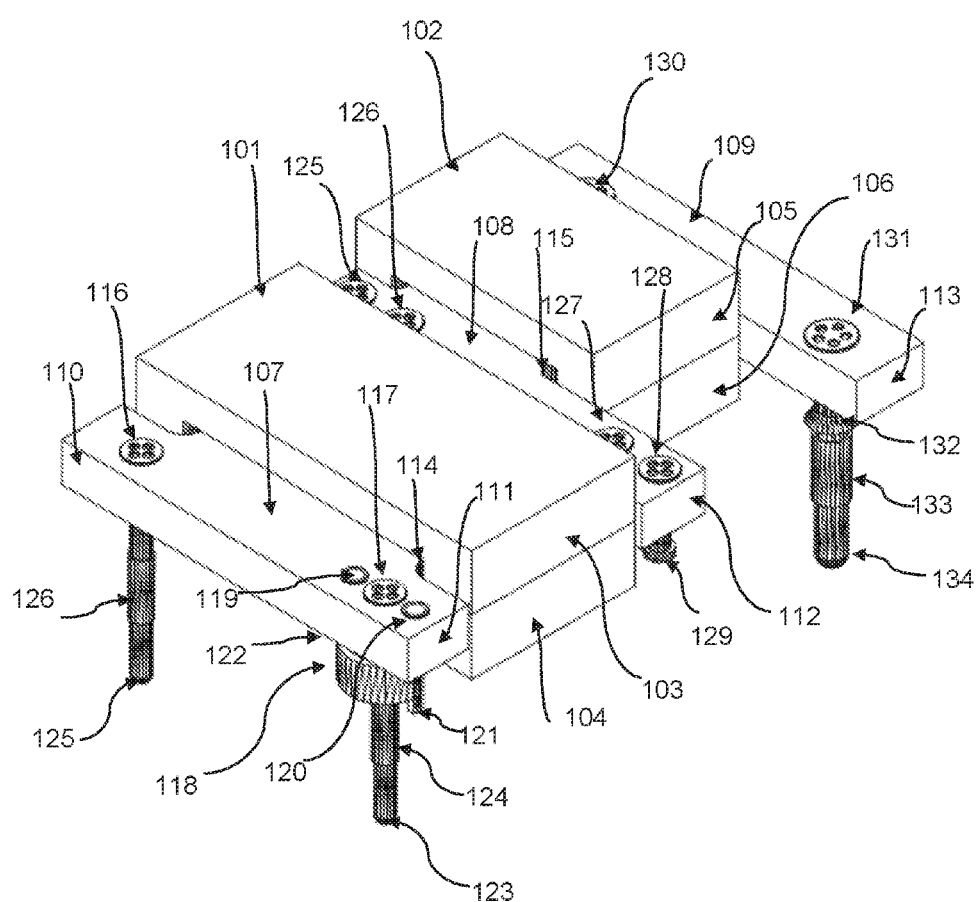
FIG. 4 is an isometric view of an exemplary embodiment of the present invention.

The physical structure shown in FIG. 4 demonstrates a certain embodiment of many of the claims made in this patent. One of the reasons it is described as a certain embodiment, and to structure the Integrated Magnetic in this fashion, is that it re-integrates with the windings on a single substrate and the magnetic cores as well, into a defined power converter module as a whole. It is one intent of the claims made herein for the Integrated Module and Incorporated Associated Components to recreate this power converter module in the same type of form factor, mechanical dimensions and connections as that possessed by the typical power converter module itself. A key aspect of the invention and one that differentiates it from any prior art is that the Integrated Magnetic can utilize the Input-Output pins and auxiliary pins in some embodiments and mechanical form factor of what is termed an industry standard DOSA module as it accomplished this re-integration. It does so in a manner that does not affect the electrical integrity or function of these Input-Output pins. Yet it does indeed utilize those pins as a necessary part of the assembly. In order to meet the severe height constraints posed by current state-of-the-art standard power modules and yet incorporate both an Integrated Magnetic assembly and an associated power component assembly, both must be configured and designed in a certain fashion, otherwise there is no true re-integration.

So discussion of the structure of the Integrated Magnetic begins with that embodiment shown in FIG. 4, which is that of an industry standard DOSA $16^{th}$ size power module for reference. Furthermore, this embodiment is that of a single-ended forward converter much like that shown schematically in FIG. 2. So the transformer T1 is the magnetic element in the $1^{st}$ position 101 and the inductor L1 is the magnetic element in the $2^{nd}$ position 102. To size the overall converter height to be competitive with fully embedded structures we set the core height of T1 using magnetic permeable elements 103 and 104 which are ferrite core pieces in this embodiment. Likewise, the core height for L1 matches that same height with magnetic permeable elements 105 and 106.

The Integrated Magnetic substrate itself consists of one 1 continuous planar element in this embodiment. At position #1 on the input side of T1 107 it contains the Input Terminals. At position #2 in between T1 and L1 108 it contains the Secondary Terminals. At position #3 on the output side 109 it contains the Output Terminals. The length of the Integrated Magnetic is defined by the length of this substrate from 107 through 109. In this SW Isometric View, side 110 shows that maximum extent on the input side. There is a corresponding maximum extent not shown on the opposite or output side. The extents of the power converter upon which the Integrated Magnetic resides are as well defined by these same extents. The width of the Integrated Magnetic, in this SW Isometric View, is defined at the extents shown as 111 on the Input side, 112 on the side that is in between the T1 and L1 elements, and 113 on the Output side. There are corresponding faces not shown on the opposite side of these three 3 positions. The Integrated Magnetic substrate fits into the apertures, or more precisely, the core windows of T1 114 and L1 115. The combination of all of these is such as to match the extents of the power converter itself to which the Integrated Magnetic assembly mounts. These structural and design aspects as shown demonstrate in this $16^{th}$ size DOSA footprint how the Integrated Magnetic is sized to be the same footprint and mechanical dimensions as that of the power converter module itself and as such, form one claim upon which this invention is based.

Another novel fundamental aspect of this invention is shown on the Input side as terminals 116 and 117. As per the schematic previously discussed in FIG. 2, the terminal 116 corresponds electrically to the connection 63 at the "dot" winding of T1 on the Integrated Magnetic substrate and to 64 at the juncture Vin+ and Cin. It makes electrical contact and connection to the Integrated Magnetic substrate through a plated thru-hole typically into which the pin or terminal is inserted. This pin is a "blind" or buried pin which means that its head or end does not project out the top. Instead, at the top surface of the Integrated Magnetic substrate resides a pad that blocks it from doing so. Integral to the pad are one or more smaller vias into which solder may flow during normal pcb reflow manufacturing so as to make such connection to the inner layers of the substrate and this pin. In such manner, the top surface remains a flat surface and forms a proper surface for subsequent placement of a heat sink or heat dissipating structure. The structure and design of this pin or terminal, its method of assembly into the Integrated Magnetic, and the corresponding flat surface on the top form three 3 claims of this invention. A fourth claim pertaining to a heat sink incorporated into the whole as a final structure.

The central portion of this pin which is connected physically at 116 as discussed above has an end terminus at location 125. This functions as the Vin+ pin of the Input Block of FIG. 2 and so is the Vin+ pin for the power converter module as well. A separate feature of this part of the terminal is depicted as 126 which for purposes of this embodiment describes a standoff portion of the terminal. Its design is set to be at the same height as the T1 core piece 104 of FIG. 4. Its function is to "standoff" the space between the Integrated Magnetic substrate and that of the power converter substrate in order to clear any component height of incorporated components installed in that space.

Similarly, the terminal 117 corresponds electrically to the connections 65, 66, 67, and 68 of FIG. 2. The central portion of the pin is a buried pin as well as discussed above. It has the same structure, assembly and connection as described above. In this instance embodiment it makes a physical connection 67 to the Integrated Magnetic substrate but no electrical connection. The electrical connection is made on the power converter substrate at 68.

What is different about this terminal however is the fact that it possesses a "cylinder" or other such portion of the terminal which is electrically isolated from the central conducting portion of the terminal. This cylinder 118 has, in this case, two 2 projections 119 and 120 which insert into the Integrated Magnetic substrate and make an electrical connection therein to the correct inner layers to which it must, namely 65 of FIG. 2. They further project downwards, in this case at locations 121 and 122 into the power converter substrate so as to make an electrical connection at 66 of FIG. 2.

The central portion of this pin which is connected physically at 117 as discussed above has an end terminus at location 123. This functions as the Vin− pin of the Input Block of FIG. 2 and so is the Vin-pin for the power converter module as well. A separate feature of this part of the terminal is depicted as 124 which for purposes of this embodiment describes a standoff portion of the terminal. Its design is set to be at the same height as the T1 core piece 104 of FIG. 4. Its function is to "standoff" the space between the Integrated Magnetic substrate and that of the power converter substrate in order to clear any component height of incorporated components installed in that space.

Concisely, this is how the Integrated Magnetic Input Terminals occupy the same physical space as that of the Input terminals of the power converter itself and so comprise those very same terminals. This novel connection forms a basic claim with regards to this invention but secondarily form separate claims as this connection method is important both for structural support and heat conduction.

The Integrated Magnetic substrate portion in the intermediate location between T1 and L1 in this embodiment 108 requires connection, as previously discussed pertaining to FIG. 2 and FIG. 3, in order to in order to connect to incorporated power components on the power converter substrate. Although the most economical in terms of occupied physical space is to use once again the co-located or cylinder terminals discussed above, the terminals shown in FIG. 4 are intentionally shown to be a simple straightforward pins. This is to demonstrate that a conventional approach is capable in such one-to-one correspondence with the terminal and its required functionality and yet is still within the confines of the patent claims. In this instance, however, what is shown is the "buried-head" pin at locations 125, 126, 127, and 128. As discussed previously, this pin is a "blind" or buried pin which means that its head or end does not project out the top. Instead, at the top surface of the Integrated Magnetic substrate resides a pad that blocks it from doing so. Integral to the pad are one or more smaller vias into which solder may flow during normal pcb reflow manufacturing so as to make such connection to the inner layers of the substrate and this pin. In such manner, the top surface remains a flat surface and forms a proper surface for subsequent placement of a heat sink or heat dissipating structure. At the opposite end of these terminals is a surface mount feature 129 which is typical of that employed for a surface mount stand-alone planar magnetic device. Within the context of the claims of this patent, this is a perfectly acceptable method of making this connection to the power converter substrate.

The output section of the Integrated Magnetic 109 again uses a simple direct connection as was discussed in the Intermediate Section 108 directly above. In the topologies illustrated in FIG. 2 and FIG. 3 it is shown that the terminal 130 makes the connection from the output inductor L1 to the Vout+ of the power converter module. Then terminal 131 functions as the Vout− of the power converter module as it connects incorporated power components on the power converter substrate. No direct electrical connection is required on the Integrated Magnetic for either of these topologies. This is how the Integrated Magnetic Output Terminals occupy the same physical space as that of the Output terminals of the power converter itself and so comprise those very same terminals. This novel connection forms a basic claim with regards to this invention but secondarily form separate claims as this connection method is important both for structural support and heat conduction. Both terminal locations utilize the "no-head" or "buried-head" structure of the pin in order that a heat sink interface may bond intimately with the Integrated Magnetic so as to conduct heat away from the structure.

Figure 5:
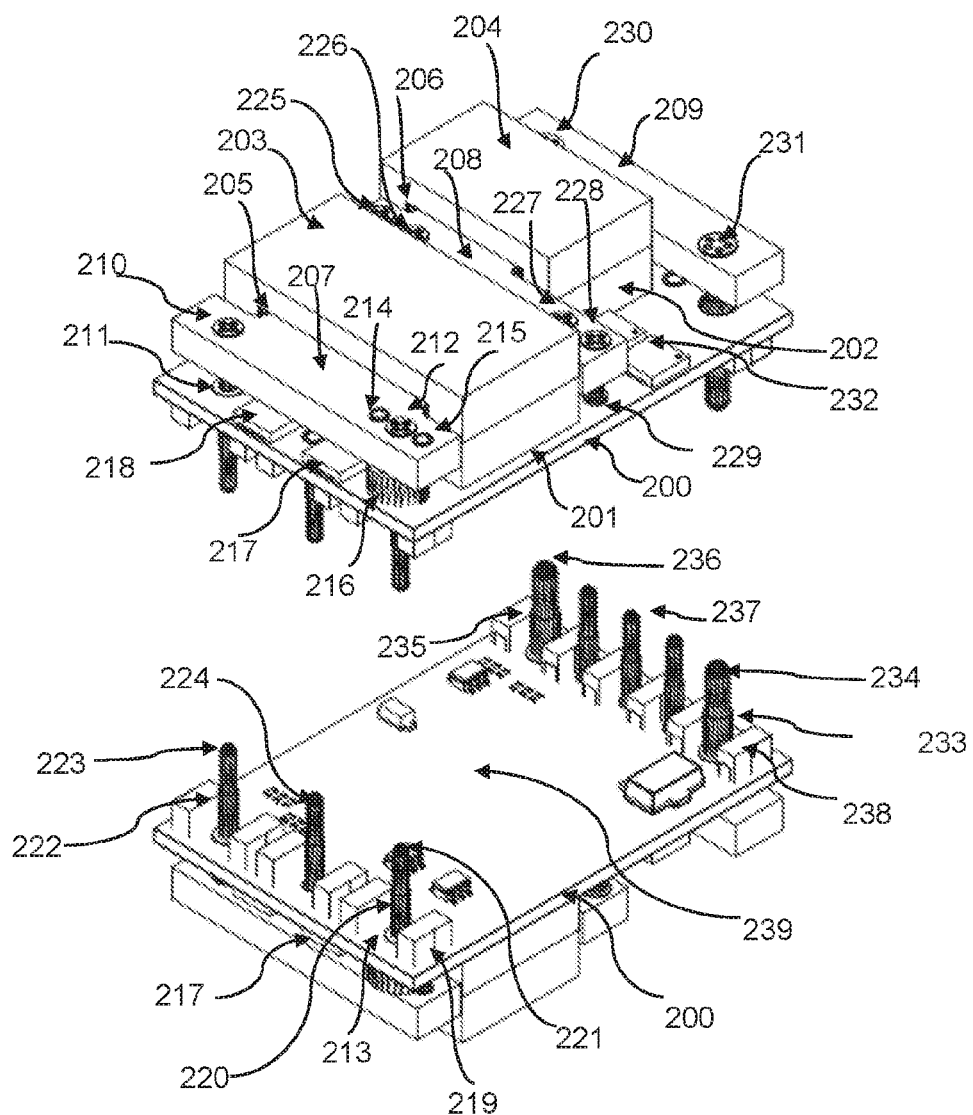
FIG. 5 is an isometric view of an exemplary embodiment of the present invention, and shown from an inverter isometric view.

The drawing in FIG. 5 illustrates a certain embodiment demonstrating conceptually and in practice with actual manufactured parts how the certain embodiment of the 16$^{th}$ size DOSA format Integrated Magnetic of FIG. 4 is constructed with a power converter substrate which contains the incorporated power components. The power converter substrate can be either externally separate from the Integrated Magnetic or it can be internally part of the same structure as the Integrated Magnetic and simply be occurring or located on separately distinct layers within the overall height of the assembled power converter module.

The Input-Output and Secondary terminals connect the two 2 substrates and in the case of the Input-Output terminals also form the connection to an external input power source and load to which the entire comprised power converter module supplies power. The input power source and load can also part of or integral to the power converter substrate in the case wherein that substrate is external to the Integrated Magnetic. The incorporated and associated power components are those necessary to the function of the power converter module. They locate and fit themselves, as previously discussed, in the spaces, apertures and interstices created by the placement of the magnetic cores—defined by T1 and L1 in the certain embodiment of FIG. 4 and FIG. 5—and the Integrated Magnetic substrate within the core window apertures. These spaces are created because the substrate height or Z-axis dimension is defined by the core window aperture height, and so there is space above and below the substrate not otherwise occupied or covered by the magnetic core elements. That space is used by the incorporated power components.

It is important to note that one of the main reasons for extending the Integrated Magnetic substrate all the way out to the board extents is to create such regions of space that can thus be occupied by these components. In all prior art and in most converter layouts this is specifically avoided and the magnetic elements are sized smaller so as not to interfere with these components. So it is thus quite the novel approach to extend the Integrated Magnetic to the extents of the power converter module and also occupy the Input-Output terminal positions. As nonsensical as that may seem to do from the onset, the result is that there actually still is adequate space to place power components and thereby "incorporate" them into a whole structure. So this is a major claim as well of this invention and FIG. 5 demonstrates one such certain embodiment.

The power converter substrate 200 is shown to be external in FIG. 5. The magnetic core elements bottom core pieces for T1 201 and L1 202 are shown resting on top of the power converter substrate 200. The magnetic elements' core window height determines the height of the Integrated Magnetic substrate which fits into the apertures of T1 at 205 and L1 at 206. So the top surfaces of the Integrated Magnetic substrate at 207 for the Input terminal side, at 208 for the Secondary terminal location, and at 209 for the Output terminal side define the maximum height of the Integrated Magnetic substrate. Since the terminals used have a "buried" or "blind" head, a heat sink or other heat dissipating structure may be place on top within the space created by surfaces 207, 208 and 209 and the top surfaces of the top core pieces T1 203 and L1 204.

The "buried-head" pin for FIG. 2 location 63 is shown making connection to the FIG. 5 Integrated Magnetic substrate at 210. At the intermediate portion of that same terminal, it Is shown making the connection to the power converter substrate at 211 which is electrically connecting Vin+ and Cin at 64 of FIG. 2. It continues on through the power converter substrate making internal connections with internal layers, if necessary and emerges the other side in order to form the power converter module Input pin. In this topology, it does this all as one pin. This demonstrates a novel construction and fundamental claim as part of this invention.

Similarly, the "buried-head" pin for FIG. 2 location 67 is shown making connection to the FIG. 5 Integrated Magnetic substrate at 212. At the intermediate portion of that same terminal, it Is shown making the connection to the power converter substrate at 213—shown in FIG. 5 from the underside viewpoint—which is electrically connecting Vin− and Cin− and Q1 source at 68 of FIG. 2. It continues top to bottom through the power converter substrate in order to form the power converter module Input Return pin.

The "cylinder" pin for FIG. 2 location 67 is shown making connection to the FIG. 5 Integrated Magnetic substrate at positions 214 and 215. The intermediate portion of that same terminal 216 "stands-off" the distance between the power converter substrate and the Integrated Magnetic substrate. It makes the connection at the power converter substrate of FIG. 2 electrically to the drain terminal of Q1 at 66.

The "cylinder" plus "central pin" feature of this terminal thus demonstrates how the one terminal in the same proximate location can function, in total, as the Input Return Terminal. It can make all of these physical connections as constructed in this embodiment of the invention. It connects the Integrated Magnetic substrate to the power converter substrate. The spacing between the two 2 substrates is defined by the thickness of one of the legs of the magnetic core elements 201 for T1 and 202 for L1. In this spacing we can place incorporated power components such as Q1 217. In prior art the T1 component would not extend out this far. It would be a much smaller device. Liberating it by extending it out to the extents and making its terminals that of the power converter module make it an effectively larger device relative to the entire power converter module. However, in so doing, we yet have sufficient space to locate and incorporate power components. This forms a fundamental claim of this invention.

Q1 is shown as well as another transistor parallel to it at location 218. Although not shown in the schematic of FIG. 2 it is shown in this embodiment to demonstrate the capability of this approach to function as a power converter module. At the same proximate location but on the underside of the power converter substrate one can locate other incorporated power components. In this case we refer to 219 which is represented by Cin of FIG. 2. As is common in practice with this topology one splits Cin into several instances of this input capacitor in order to improve the performance of the converter. So in FIG. 5 we can see six 6 instances of this component and how it is laid out in this practical and functioning converter. The component height is sized to be low profile. The intent is that the height of underside mounted components, plus that of the power converter substrate itself, added to the height of T1 and L1 creates an overall height for a complete power converter that is competitive with the overall height for a fully embedded power converter in the marketplace today. Coupled with a heat sink placed on the top increases its performance even further. The sum total of these individual ideas and improvements as implemented in this certain embodiment comprising FIGS. 2,3, and 5 forms a fundamental claim of this invention.

The Input Return terminal has a "stand-off" portion as well on the underside as shown in 220. This just clears the component height of the underside mounted components, It functions much akin to converters currently in the market today in terms of creating a plug-in module. A fundamental claim of this invention is to duplicate the pinout of the power converter module with the construction detailed herein. In the case of the embodiment shown in FIGS. 2,4 and 5, it is that of a $16^{th}$ size DOSA compatible power module. The pin portion 221 inserts into some external board to complete the connection to the input source.

Completing the input side, the underside view likewise shows the Input Terminal construction 222 and 223 which are the same as the Input Return Terminal. However, we have also added in this view a third terminal 224. In a standard DOSA $16^{th}$ power module this functions as a Remote Turn-On/Off pin. It is added here since the power converter substrate 200 can also contain components related to its function and internal traces as well.

The intermediate portion of the Integrated Magnetic 208 accomplishes a direct connection as per FIG. 2 62 from the T1 secondary to the input side of L1. It also contains the secondary side terminations required for connection to traces and components on the power converter substrate. The "buried-head" or "blind-head" terminal top shown in 225, 226, 227, and 228 of the Integrated Magnetic repeats that of FIGS. 4 125, 126, 127, and 128, so that same discussion applies here and will not be repeated. However, one can see how the surface mount foot utilized in this terminal design 129 of FIG. 4 now mounts to the power converter substrate as shown in FIG. 5 229.

In the implementation of the certain embodiment of the $16^{th}$ size DOSA compatible standard size it is such that the inductor L1 component can be sized and placed as shown with respect to the entire footprint. This is not a necessary condition or outcome and a wide variety of options are open to the design. However, in this case it is viewed as a certain embodiment because it creates a sufficiently wide aperture to place components adequate to the power delivery of the converter as a whole. Thus at location 232 are placed two 2 FETs which act as synchronous rectifiers and represent Q2 and Q3 of FIG. 2. These constitute incorporated power components within the scope of the claims of this invention. There is room for more components to be placed. However, it is important to allow full access in this aperture for a heat sink to be placed subsequently thereon. It can be separate from or integral to the heat sink mounted to the top of the Integrated Magnetic substrate. It is the intent of the use of the "buried-head" style terminals to allow for that on the top surface as previously discussed so all of the terminals in FIG. 4 and FIG. 5 drawings are shown this way as a certain embodiment.

One reason for making connections 225 through 228 on the top side of the power converter substrate of the surface-mount variety is that it makes for a completely free area underneath as illustrated by 239. It was intentionally left vacant in FIG. 5 to specifically show this. Although it can be utilized for heat conduction purposes to the board or device to which the composite converter mounts to, it is better utilized to accommodate control circuit components or additional power or storage components. So the concept of incorporated power components is broadly defined. However, it is how they are implemented in the overall structure that forms a novel method with respect to this invention.

Finally, for the output side portion of the Integrated Magnetic substrate 209 we have the "buried-head" or "blind-head" output terminals as referenced by 230 and 231. They are of the same construct as in FIGS. 4 130 and 131 and connect electrically as in FIG. 2 previously discussed. The "stand-off" portion of the Output Return Terminal 233 and Output Terminal 235 are designed to clear the incorporated power components placed on the underside of the power converter substrate 238. Component 238 is shown as Cout and is repeated and located many times as indicated in this certain embodiment. That portion of the terminal indicated as 234 and 236 connects or inserts into an external board or device. The three 3 terminals indicated in 237 are added in this FIG. 5 to demonstrate electrical and physical compatibility with that of a $16^{th}$ size DOSA format power module. They typically perform auxiliary circuit functions of remote sense and trim. Circuitry and components may be added to the power converter substrate to accommodate and perform these respective functions. They are typically of the same design as the other output terminals, except thinner diameter. They can be either added, or not such as the case may be.

Figure 6A:
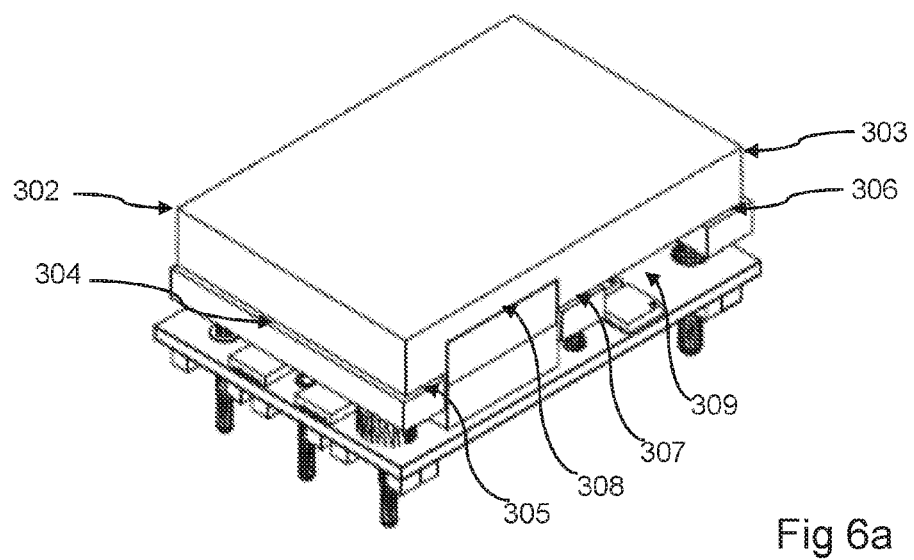
FIG. 6a is an isometric view of an exemplary embodiment of the present invention, demonstrating movement of an applicator ball.
Figure 6B:
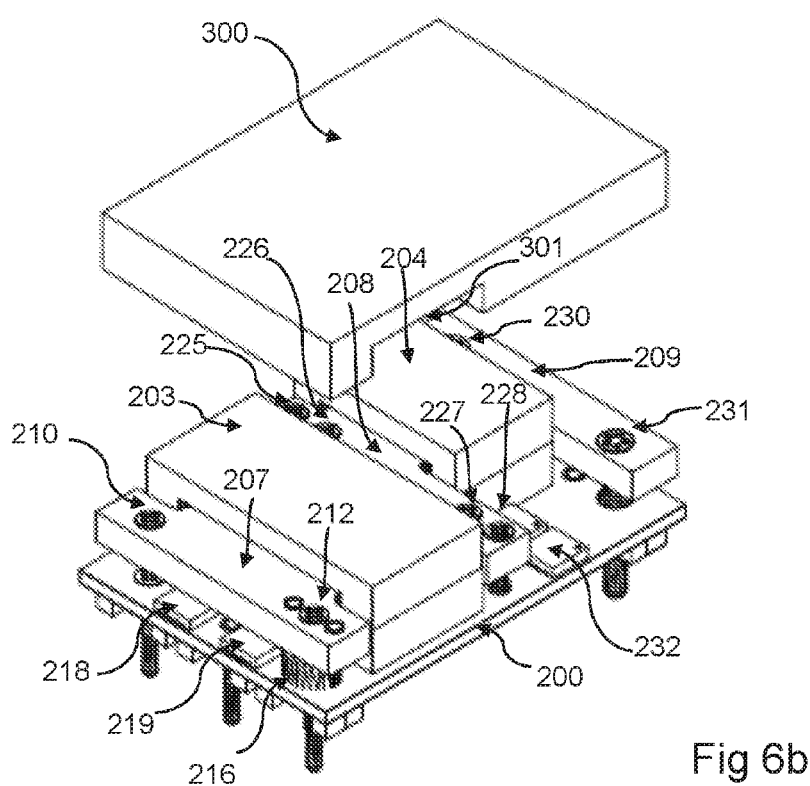

Continuing along we next address adding a heat sink to the entire assembly. That is shown in FIG. 6. The ideas, concepts, and implementations addressed previously as novel claims now bear further fruit. So we see in FIG. 6 the heat sink 300 attached to the Integrated Magnetic top in this certain embodiment. The flat core tops of the magnetic elements 203, 204 form a flat surface and readily accommodate the heat sink. In addition, the flat sections of the Integrated Magnetic substrate at locations 207, 208, and 209 also form a flat surface. Since the outline for the Integrated Magnetic has been extended to the full extents of the power converter module these surfaces are larger than would be yielded if one had not done so. Prior art cannot do this. Furthermore, the flat heads of the "buried-head" or "blind-head" pins are as well designed to accommodate the heat sink. So input locations 210 and 212, output locations 230 and 231, and intermediate secondary locations 225, 226, 227, and 228 can all bond directly as well to the heat sink. The heat sink forms an intimate bond with the Integrated Magnetic substrate at locations 304, 305, 306, and 307 along the entire surface. This is quite the novel idea and approach and is not capable of being implemented with current state of the art fully embedded assemblies. There are apertures for the magnetic core elements so that the heat sink can extend down and capture these surfaces. An aperture 301 is shown for the component T1 and is bonded intimately at 308. A similar aperture and bond is created for the L1 element but cannot be shown in this view. A cut-away is shown in 309 through which such aperture the heat sink can also project down and capture the top flat surfaces of incorporated power components on the power converter substrate as well. It is implemented in one place in FIG. 6 but can be executed as well in other areas through apertures suitably available. That is a completely unique idea in that such design allows heat extraction by gaining access all the way down to the power converter substrate and the incorporated power components mounted thereon.

Figure 7:
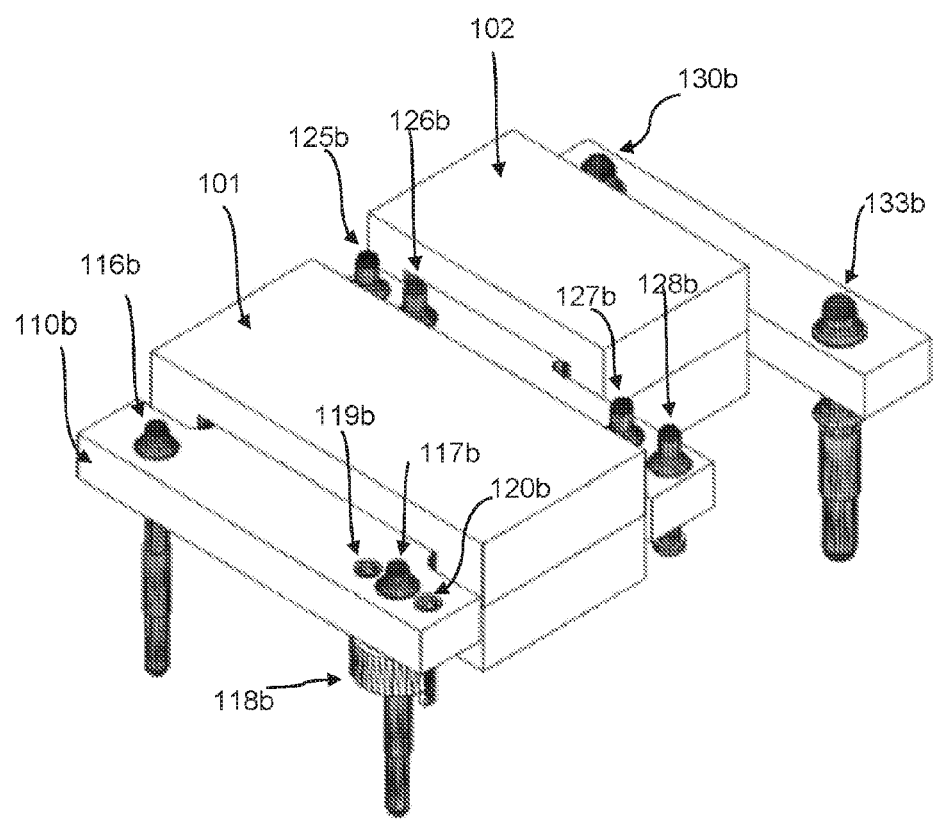
FIG. 7 is an isometric view of an exemplary embodiment of the present invention.

The certain embodiment discussed via FIGS. 4,5 and 6 centers around an implementation of a single ended converter meeting a DOSA $16^{th}$ footprint and pinout. Another embodiment is that shown in FIG. 7. Its footprint as before extends all the way to the extents as defined by the power converter module and substrate. Its footprint as well occupies the same terminal locations as the power converter module and substrate. The magnetic core elements are the same as previous, namely T1 as 101 and L1 as 102. However, the variation shown here is if one elected not to use the "buried-head" or "blind-head" style of pin or terminal, one could utilize simple pins—that is, pins of a type utilized in many current state of the art planar magnetics. This is shown in FIG. 7. In this case we have the pins projecting out of the Integrated Magnetic substrate. There are the input side pins consisting of 116b, 117b, 119b, and 120b. There are the output side pins consisting of 130b and 133b. Finally, there are the intermediate pins in the Secondary space consisting of 125b, 126b, 127b and 128b.

The design, functionality and construction of the pins otherwise remains the same as discussed in previous embodiments. However, due to the projection out from the flat surface at the top of the Integrated Magnetic we cannot bond the heatsink 300 of FIG. 6 in locations 207, 208, and 209 of FIG. 6. This embodiment represents an improvement simply due to the fact that the Integrated Magnetic substrate uses the maximum extents of the power converter substrate and module as well as the input and output pin locations. However, the heat sink incorporated into the design in this instance can only bond to the top surfaces of magnetic components T1 at 101 and L1 at 102. The area for heat extraction has been decreased.

Figure 8:
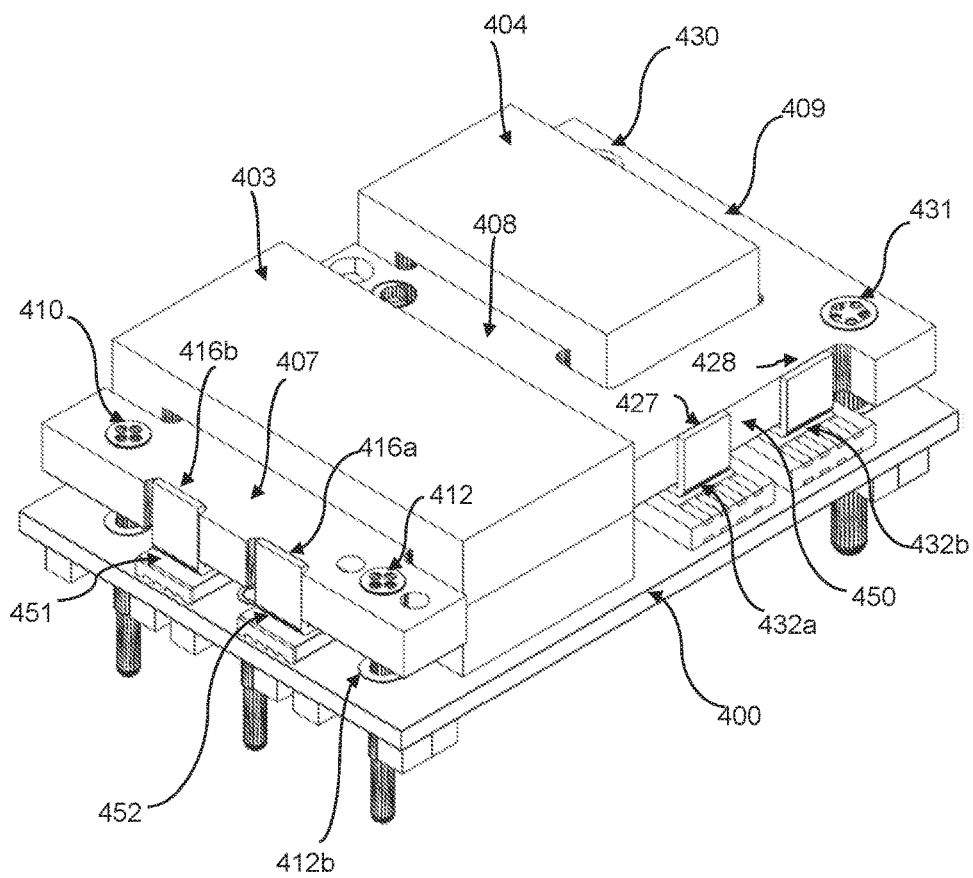
FIG. 8 is an isometric view of an exemplary embodiment of the present invention.

Another embodiment is that shown in FIG. 8. Its footprint as before extends all the way to the extents as defined by the power converter module and substrate. Its footprint as well occupies the same terminal locations as the power converter module and substrate. The magnetic core elements are the same as previous, namely T1 as 403 and L1 as 404. We have the Integrated Magnetic mounting as before to a separate power converter substrate 400. The Integrated Magnetic substrate creates a flat surface as before in locations 407, 408, and 409 corresponding in sequence to the Input, Secondary and Output portions or areas of the Integrated Magnetic. The "buried-head" or "blind-head" pins are utilized as well to create an overall flat surface so that a heat sink may again be intimately attached as before discussed relating to FIG. 6. The variation this embodiment demonstrates relates to the pin or terminal construction and how connection is made to incorporated power components on the power converter substrate.

The Input Terminal 410 connects to T1 "dot" as before and makes simultaneous connection electrically and physically. as in 63 and 64 of FIG. 2 to the Input Block at Vin+ and Cin+. The Output Return Terminal 412b connects as before to Q1 Source terminal, Cin− and Vin− as in 68 of FIG. 2. It also physically connects to the Integrated Magnetic substrate 412 at 67 of FIG. 2. What is missing, however, from the previous embodiment is the "cylinder" part of this terminal.

The connection in accordance with FIG. 2 at point 65 to the "non-dot" of T1 on the Integrated Magnetic substrate is now made in a "proximate location" indicated by 416a. It connects to incorporated power component Q1 drain terminal on the power converter substrate at 452. What is new and unique is that this terminal takes advantage that the Q1 component has a "top-mounted" Drain terminal. Its meaning having a "top-mounted" Drain terminal is that this component package is configured that way—i.e. it has a metallization physically located on the top of its package and it is electrically connected to the Drain function of the component. There is no copper pour, trace, or other connection for the Drain terminal of Q1 on the power converter substrate. However, its Source terminal does have such connection. In effect, we have a series connection made in this way which is novel and new entirely. Similarly, a location 416b is shown adjacent on the Integrated Magnetic. This connection can make a parallel connection to a component Q1b 451 as per above or it can be dedicated to a separate transistor designated the "active-clamp", typical of an active clamp forward topology. In any case, the component has a top metallization which side faces upward and can connect to the terminal coming from the Integrated Magnetic. These terminals 416a and 416b yet present a flat surface on top of the Integrated Magnetic substrate and the heat sink illustrated in FIG. 6 can be attached accordingly.

The output terminals are similar to that of the input terminals in this variation. Output Terminal 430 is a "buried-head" style that makes connections 75 and 76 of FIG. 2 and is functionally and physically the same as in the previous embodiment. The same may be said for the Output Return Terminal 431 making connections 73 and 74 of FIG. 2. As before, these terminals present a flat surface on top of the Integrated Magnetic substrate and the heat sink illustrated in FIG. 6 can be attached accordingly.

The Secondary side terminals in the intermediate location are different. What is missing are the direct pin terminals 225 and 226 of FIG. 5. Furthermore, the Integrated Magnetic substrate no longer has an aperture at the previous location for incorporated power components 232 of FIG. 5 or Q2 and Q3 of FIG. 2. Instead the Integrated Magnetic extends all the way to the maximum board extents and has recesses created to accommodate terminals 427 and 428. Terminal 427 functions as connection 71 on the Integrated Magnetic substrate and then connects as 72 of FIG. 2 and connects to a top metallization terminal of Q2 of FIG. 2. Terminal 428 functions as connection 69 on the Integrated Magnetic substrate and then connects as 70 of FIG. 2 and connects to a top metallization terminal of Q3 of FIG. 2. As before with the other Integrated Magnetic sections, this intermediate section creates a flat surface in its entirety and so can bond intimately to a heat sink.

So the embodiment illustrated by FIG. 8 demonstrates some further claims unto its own that form part of this invention and expand on its application.

A complete power module is the result of constructing the separate constituent parts which are comprised of:
1. An Integrated Magnetic Substrate,
2. Magnetic Elements mounted therein
3. A Power Converter Substrate,
4. Associated Incorporated Components located top and bottom on the Power Converter Substrate,
5. A Composite Mechanical Footprint as defined by the mechanical extents of the Integrated Magnetic Substrate and Power Converter Substrate,
6. A Composite Electrical Pinout as defined by the Input-Output pins which are coincident to and co-located as those of the Integrated Magnetic and Power Converter substrates.

A complete power converter module constructed in this way will be hereinafter referred to as a "Composite Module"

Assembling all of the above into one composite structure and mounting same on an external board in order to wholly or partially fulfil the system power needs is one of the explicit intents of this invention. Configuring the power requirements for a system in this manner is a claim that is made herein. Constructing the power module in this manner is a claim that is made herein. Supplying the power module in this form in order to function as a Demonstration Board or Reference Design is as well a claim of this invention herein.

Figure 9:
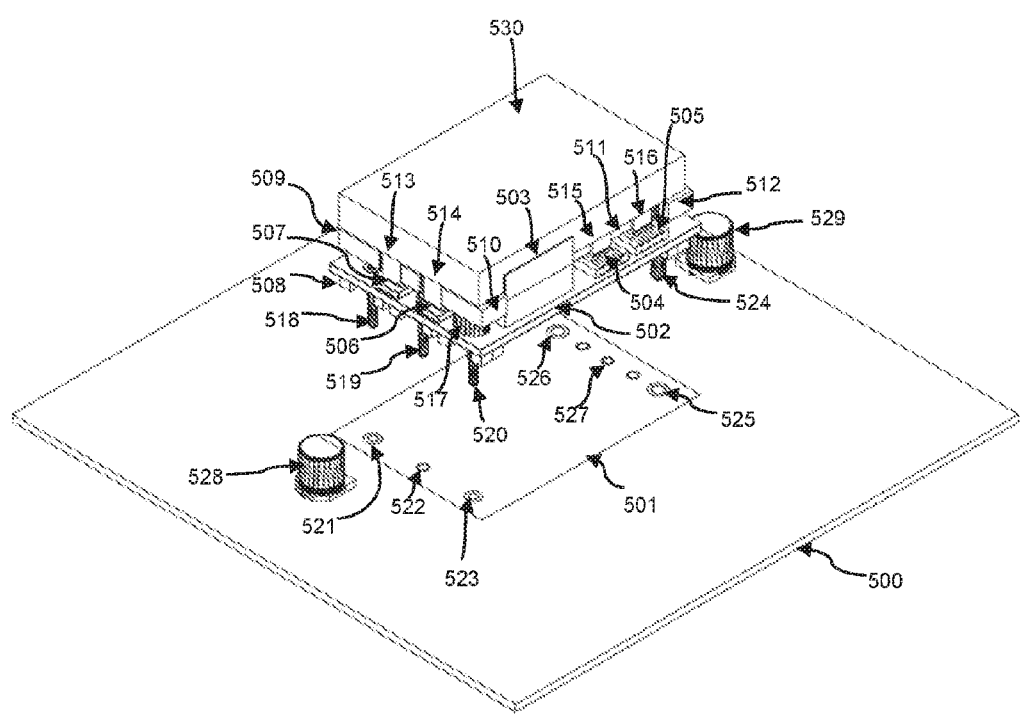
FIG. 9 is an isometric view of an exemplary embodiment of the present invention.

The discussion continues then in the context of FIG. 9 which demonstrates a power converter module constructed out of these composite elements to form a whole and which is subsequently mounted on an external board which represents the system to which the power converter supplies power.

The system board to which the power converter module would mount is shown as an arbitrarily plane as 500. The extent of the footprint or area allowed by the system board is shown as 501. Within that footprint are thru-holes 521, 522, and 523 which accept the Input terminals 518, 519, and 520 of the Composite Module. Within that footprint are thru-holes 525 and 526 which accept the Output terminals of the Composite Module—(in this view only the terminal 524 is capable of being shown). In addition, there are three 3 thru-holes for Auxiliary pin functions indicated as 527 which can accept Auxiliary Output terminals of the Composite Module.

The system board 500 also shows two 2 components 528 and 529 which are typically mounted outside the converter footprint of 501. Typically, there are more components that reside outside the converter footprint whose function are associated with power storage or auxiliary power function or are part of the EMI filtering function related to the power converter. It is typical to mount these outside since every system has its diverse requirements. It is thus the situation in the current state of the art to have the power converter not incorporate all of the components required of the system otherwise there would be little standardization as applied to a power converter module. For reference, FIG. 9 demonstrates the certain embodiments discussed in FIGS. 4,5,6 and 8 previously.

The Power Converter Substrate is indicated in 502. The magnetic element T1 503 of the certain embodiment is shown. (The element L1 of the certain embodiment cannot be shown in this view). T1 sits on the Power Converter Substrate in this one embodiment. The associated incorporated power components that sit on top of the Power Converter Substrate are indicated as 504, 505, 506, and 507. They have been fully discussed in previous Figures and embodiments. The associated incorporated power components that sit on the bottom of the Power Converter Substrate are collectively referred to as 508. They can be located anywhere on the bottom of this substrate. There are certain locations as discussed and demonstrated previously in FIG. 5 specifically.

The Integrated Magnetic Substrate is indicated by 509, 510, 511 and 512 in succession which define the extents of the Composite Module and conforms to the extents of the system outline of 501. The outline of the Power Converter Substrate of 502 follows this as well.

Making the required connections from the Integrated Magnetic Substrate to the Power Converter Substrate are the terminals shown as 513, 514, 515, and 516. This particular embodiment follows specifically from that discussed in reference to FIG. 8. However, for purposes of continuity of discussion, the terminal shown as 517 was added to this embodiment to show and demonstrate the certain embodiments of FIGS. 4,5, and 6.

Finally, the heat sink 530 may be added, to the top as discussed for the certain embodiment. This caps off the construction of a Composite Module. All of these separate and constituent parts can thus be assembled as shown in FIG. 9 and form a Composite Module. The construction and method of assembly and use therein to supply power to a system is a fundamental result of the application of this invention and forms part of the invention itself.

Figure 10:
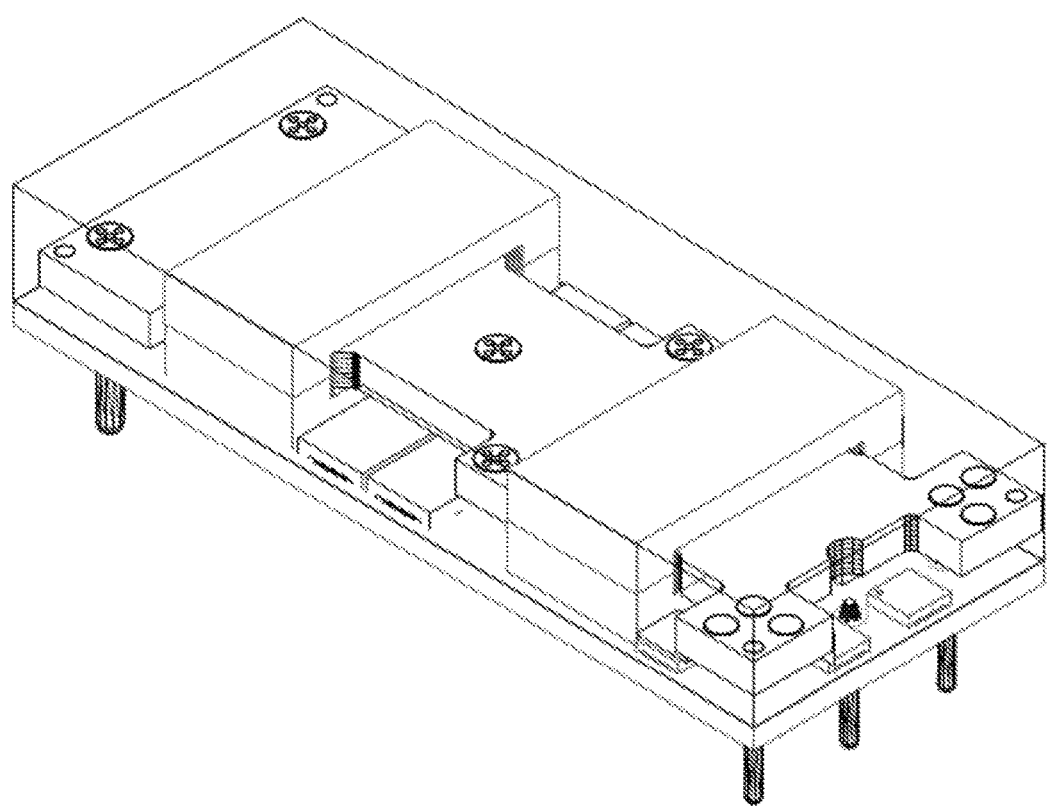
FIG. 10 is an isometric view of an exemplary embodiment of the present invention.

FIG. 10 illustrates conceptually how a power converter module can be constructed in a standard DOSA $\frac{1}{8}^{th}$ size footprint and mechanical. It incorporates many of the same concepts as discussed previously. This embodiment demonstrates one feasible manner of creating the apertures in the Integrated Magnetic and how they may be placed on the Power Component Substrate.

Figure 11:
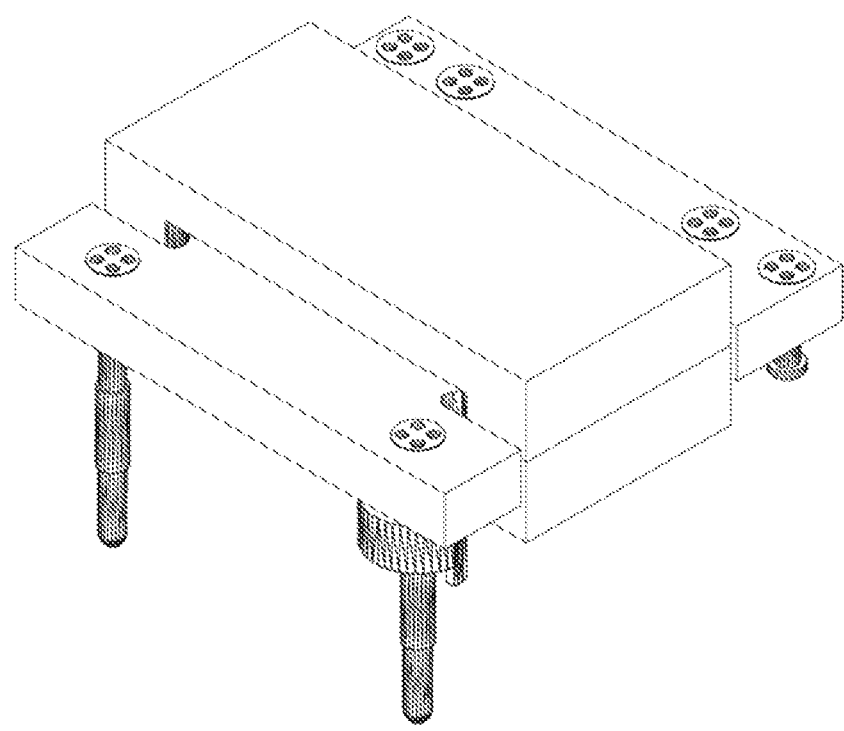
FIG. 11 is an isometric view of an exemplary embodiment of the present invention.

FIG. 11. Illustrates the most basic concept of how an Integrated magnetic can reduce at an extreme to one 1 magnetic element and yet utilize the concepts and claims as discussed previously. In this embodiment, the Integrated Magnetic shown is that as would be constructed to fit within the mechanical constraints of a DOSA $1.32^{nd}$ size. The magnetic component would typically be that of a flyback transformer or coupled inductor. It would be mounted similarly on some external power component substrate not shown whose incorporated power components on said substrate would form an entire working DC-DC converter.

Figure 12:
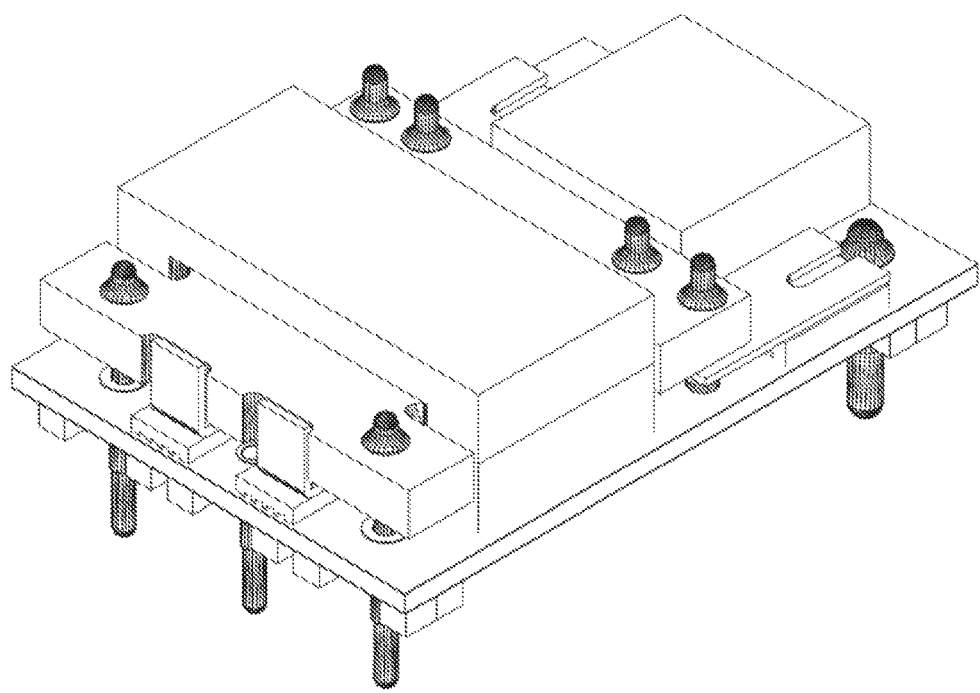
FIG. 12 is an isometric view of an exemplary embodiment of the present invention.

FIG. 12 illustrates a combination of previously discussed concepts and claims as embodied or shown for a $16^{th}$ size DOSA footprint. In this case the terminals on the input or primary side are as those implemented both for those co-loated with input/output terminals and for "proximate terminals" to connected to FETs with top side metallization connections. The secondary side illustrates how those terminals may be made in a different fashion so as to make an electrical connection.

What is different regarding this figure is that the $2^{nd}$ magnetic element—in this case, the output inductor L1—can be a discrete component and still be conceptually within the description of an Integrated Magnetic as it is integrally part of the Integrated Magnetic substrate via suitable connections.

It should be understood, of course, that the foregoing relates to exemplary embodiments of the invention and that modifications may be made without departing from the spirit and scope of the invention as set forth in the following claims.

We claim:

1. A magnetic device assembly, comprising:
   a substantially planar power converter substrate providing incorporated power components utilizing power input and output terminals, wherein the power converter substrate has an extent defined by a predetermined power converter device and associated power input and output terminals; and
   a substantially planar integrated magnetic substrate providing at least one magnetic device utilizing integrated input and output terminals, wherein each integrated input and output terminal is co-located with a respective power input and output terminal,
   wherein the integrated magnetic substrate is mounted adjacent the power converter substrate so as to be spaced apart by a standoff space in a stacked orientation,
   wherein a portion of the incorporated power components reside within the standoff space, and
   wherein at least one co-located power and integrated terminal is interconnected by a dual directed terminal,
   whereby, a physical extent of the integrated magnetic substrate and the power converter substrate extent are generally coextensive with each other.

2. The magnetic device assembly of claim 1, wherein each dual directed terminal comprises:

a central portion extending between a distal end and a terminus end;

a conductive element wrapped along a portion of the central portion; and an insulating medium between the portion of the central portion and conductive element.

3. The magnetic device assembly of claim 1, wherein the distal end is generally flush with a first surface of the integrated magnetic substrate defining a buried terminus.

4. The magnetic device assembly of claim 3, further comprising a heat sink disposed adjacent to at least one said distal end.

5. The magnetic device assembly of claim 1, wherein each dual directed terminal comprises a flat shoulder for setting the standoff distance.

6. The magnetic device assembly of claim 5, wherein the at least one magnetic device comprises at least one transformer-inductor pair, each comprising a transformer device and an inductor device.

7. The magnetic device assembly of claim 5, wherein an overall converter height is defined by the magnetic permeable elements of the magnetic elements, and wherein each heat sink is confined between said top surface and the overall converter height.

8. The magnetic device assembly of claim 1, wherein the predetermined power converter device is configured to accommodate industry standard mechanical dimensions and pin-outs established.

9. The magnetic device assembly in claim 1, wherein the integrated magnetic substrate comprises at least one planar layer, each layer containing at least one of a plurality of conductive elements, wherein the plurality of conductive elements comprises a magnetic winding of the at least one magnetic device, and wherein each planar layer may include electrical vias, traces or paths.

10. The magnetic device assembly of claim 1, wherein the integrated magnetic substrate and the power converter substrate can be merged into a unified whole composite substrate.

11. The magnetic device assembly of claim 2, wherein the central portion makes connection to the integrated magnetic substrate, the power converter substrate, and a separate PCB to which the magnetic device assembly mounts.

12. The magnetic device assembly of claim 4, wherein the buried terminus a suitably arranged blind vias configured to mount the heat sink thereon.

13. The magnetic device assembly of claim 6, further comprising:

at least one power intermediate terminal associated with the predetermined power converter device;

at least one integrated intermediate terminal disposed between the transformer-inductor pair co-located with a respective power terminal.

14. The magnetic device assembly of claim 1, wherein the at least one co-located power and integrated terminal comprises a vias internalized in the integrated magnetic substrate; and a plurality of plated surface mount pads coupled the power converter substrate.

15. The magnetic device assembly of claim 1, wherein the at least one co-located power and integrated terminal is configured as a current sense transformer magnetic element for making a direct electrical connection to said input terminal.

16. The magnetic device assembly of claim 1, further comprising a metallization coupled to at least one of the incorporated power components, and wherein at least one of the integrated terminals is configured in a shape to make connection to said metallization making required circuit connections.

17. The magnetic device assembly of claim 11, wherein at least one of each central portion is-proximate and not coincident to a respective terminal.

18. The magnetic device assembly of claim 6, wherein the at least one magnetic device comprises a transformer device nearest the integrated input terminal and an inductor device nearest the integrated output terminal.

19. The magnetic device assembly of claim 6, wherein the at least one magnetic devices comprises an inductor device nearest the integrated input terminal and a transformer device nearest the integrated output terminal.

20. The magnetic device assembly of claim 6, wherein in the at least one magnetic device comprises only a single transformer.

21. The magnetic device assembly in claim 1, wherein the magnetic device assemble is scalable in size alone or in conjunction with the power converter substrate to any physical size defined by the power converter itself.

22. The magnetic device assembly in claim 1, wherein at least one magnetic device is discrete of the integrated magnetic substrate, and wherein the at least one magnetic device is mountable and couplable to the power converter substrate.

* * * * *